(12) United States Patent
Bögl et al.

(10) Patent No.: US 8,423,952 B2
(45) Date of Patent: Apr. 16, 2013

(54) METHOD AND AN APPARATUS FOR AUTOMATIC EXTRACTION OF PROCESS GOALS

(75) Inventors: Andreas Bögl, St. Nikola (AT); Gustav Pomberger, Linz (AT); Michael Schrefl, Altenberg (AT); Norbert Weber, Glonn (DE)

(73) Assignee: Siemens Aktiengesellschaft, München (DE)

( * ) Notice: Subject to any disclaimer, the term of this patent is extended or adjusted under 35 U.S.C. 154(b) by 1234 days.

(21) Appl. No.: 12/240,084

(22) Filed: Sep. 29, 2008

(65) Prior Publication Data
US 2010/0083215 A1    Apr. 1, 2010

(51) Int. Cl.
*G06F 9/44* (2006.01)
(52) U.S. Cl.
USPC .......................................................... 717/105
(58) Field of Classification Search .................... 717/105
See application file for complete search history.

(56) References Cited

U.S. PATENT DOCUMENTS

2007/0245297 A1* 10/2007 Kuester et al. ................ 717/104
2010/0293451 A1* 11/2010 Carus ............................ 715/230

OTHER PUBLICATIONS

Lin et al., "Semantic Annotation Framework to Manage Semantic Heterogeneity of Process Models", CAiSE 2006, p. 433-446.*
Thomas et al., "Semantic EPC: Enhancing Process Modeling Using Ontology Languages", Apr. 2007.*
Yun, L. et al: Semantic Annotation Framework to Manage Semantic Heterogeneity of Process Models. CAiSE 2006, 433-446.
Anton, I. A., Goal based requirements analysis. In Proceedings of the 2nd International Conference on Requirements Engineering (ICRE 1996), pp. 136-144, 1996.
Baines, T., Adesola, S.: Developing and evaluating a methodology for business process management. Business Process Management Journal, Feb. 2005.
Boegl, A., et al.: Semantic Annotation of EPC Models in Engineering Domains by Employing Semantic Patterns In: Proceedings of the 10th International Conference on Enterprise Information Systems (ICEIS 2008), Jun. 12-16, 2008, Barcelona, Spain, 2008.
Boegl, A., et al.: Knowledge Acquisition from EPC Models for Extraction of Process Patterns in Engineering Domains. Multikonferenz Wirtschaftsinformatik 2008 (MKWI 2008), München, 2008;Book.
Brash, D., Stirna, J.: Describing Best Business Practices: A Pattern-based Approach for Knowledge Sharing In Proceedings of the 1999 ACM SIGCPR Conference on Computer Personnel Research (New Orleans, Louisiana, United States, Apr. 8-10, 1999). J. Prasad, Ed. SIGCPR '99. ACM, New York, NY, 57-60, 1999; Others.
Dardene, A.; Lamsweerde, A.; Ficaks, S.; Goal-directed requirements acquisition . Science of Computer Programming, 20(1-2):3-50, 1993.

(Continued)

*Primary Examiner* — Li B Zhen
*Assistant Examiner* — Lenin Paulino

(57) ABSTRACT

A method and an apparatus for automatic extraction of process model comprising model elements named by natural language expressions and annotated with semantic linkages to a reference process ontology are disclosed. The process model is split into partial process models by which an annotated partial process model is created. Process goals are decoupled from each annotated partial and hierarchical process goal tree is generated for each annotated partial process model.

15 Claims, 23 Drawing Sheets

OTHER PUBLICATIONS

Paolo Giorgini, John Mylopoulos, Eleonora Nicchiarelli, and Roberto Sebastiani: Formal Reasoning Techniques for Goal Models. In S. Spaccapietra, S. T. March, and Y. Kambayashi (Eds.), Conceptual Modeling—ER 2002, proceedings of the 21 st International Conference on Conceptual Modeling, LNCS 2503 Springer, 2002.

Volker Gruhn and Ralf Laue: How Style Checking Can Improve Business Process Models. INSTICC: 8th International Conference on Enterprise Information Systems (ICEIS 2006), 2006.; Others.

An agent-oriented modelling framework, Last Visited: Jul. 25, 2008.

Evangelia Kavakli, Pericles Loucopoulos: Goal Modelling in Requirements Engineering: Analysis and Critique of Current Methods. In Information Modeling Methods and Methodologies (Adv. topics of Database Research), John Krogstie, Terry Halpin and Keng Siau (eds), IDEA Group, pp. 102-124, 2004.

Yun Lin and Arne Sølvberg: Goal Annotation of Process Models for Semantic Enrichment of Process Knowledge. In Proc. of the 19th International Converence on Advanced Information Systems Engineering (CAISE 2007) pp. 355-369, Trondheim, Norway: LNCS 4495, Springer Verlag, 2006.

Ricardo Mendes, André Vasconcelos, Artur Caetano, João Neves, Pedro Sinogas, JosãTribolet: Understanding Strategy: a Goal Modeling Methodology. 7th International Conference on Object-Oriented Information Systems, Calgary, Canada, p. 437-446, 2001.

Mylopoulos, J.; Chung, L., Yu, E.: From Object-Oriented to Goal-Oriented requirements analysis. Communications of the ACM 42, 31-37, 1999.

John Mylopoulos, Lawrence Chung, and Brian Nixon: Representing and Using Nonfunctional Requirements: A Process-Oriented Approach. IEEE Transactions on Software Engineering, SE-18(6), 483-497, 1992.

Potts, C., Takahashi, K., Anton, A.I: Inquiry-based requirements analysis. In IEEE Software (11(2), pp. 21-32, 1994.

Colette Rolland, Carine Souveyet, and Camille Ben Achour: Guiding Goal Modeling Using Scenarios. IEEE Transactions on Software Engineering, vol. 24, No. 12, Dec. 1998.

Reinhard Schuette, Thomas Rotthowe: The Guidelines of Modeling as an approach to enhance the quality of information models. In: Conceptual Modeling—ER '98. 17th International ER-Conference. T. W. Ling, S. Ram, M.L. Lee (Eds), 230-254, 1998.

Eric Yu and John Mylopoulos: Why Goal-Oriented Requirements Engineering.Foundations of Software Quality (1998), Last visited Jul. 26, 2008.

* cited by examiner

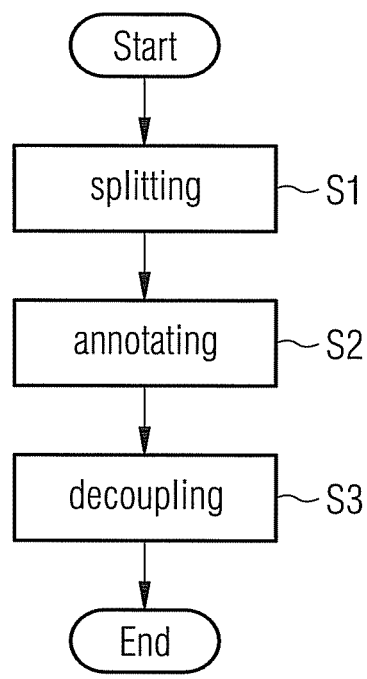

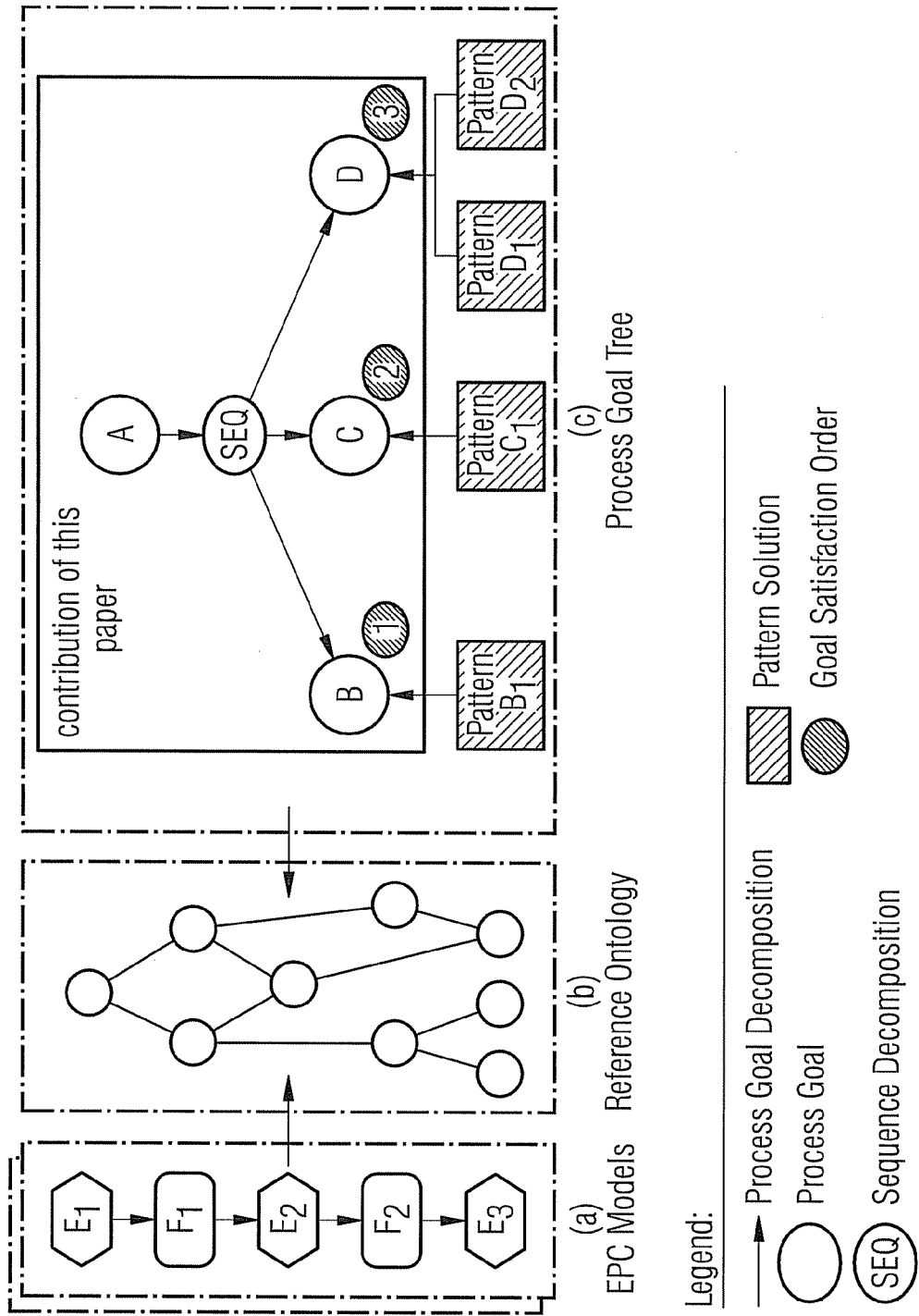

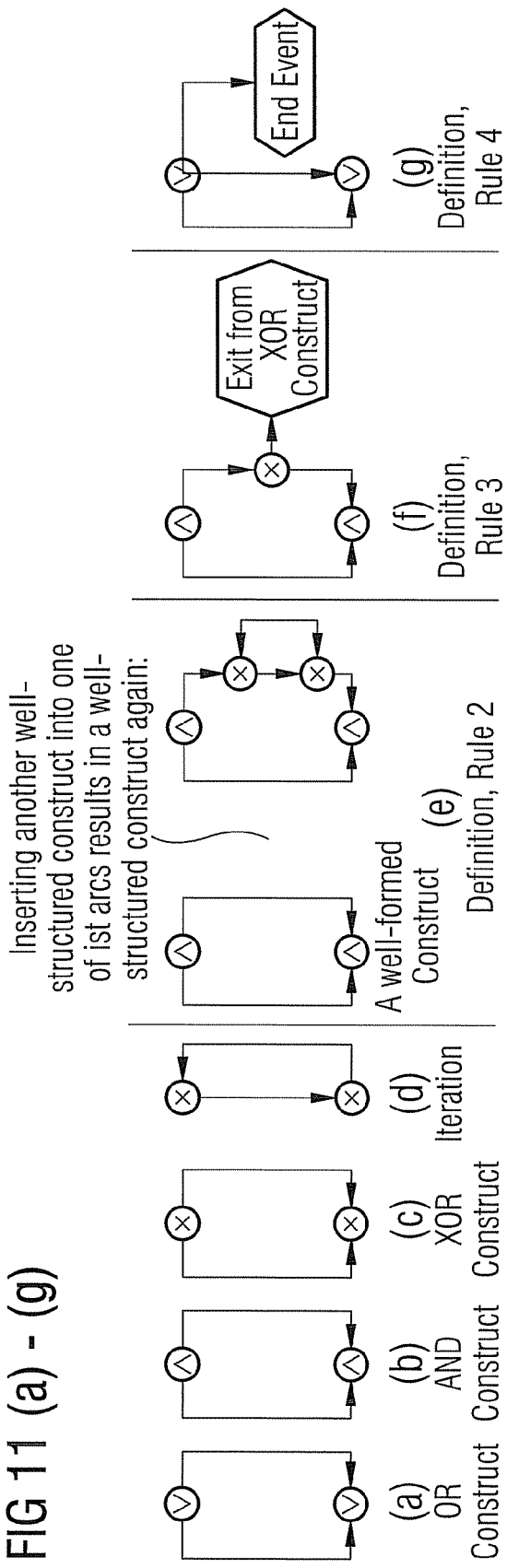
FIG 11 (a) - (g)
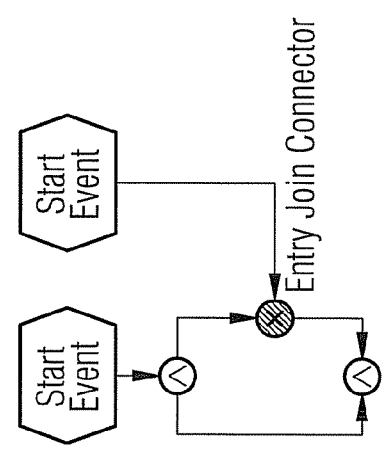
FIG 12

FIG 17

```
Algoritm I: G_TREE = CONSTRUCTION
Input:   semantically annotated modelItem
Output:  G_TREE = (N, V) for sEPC_split 1.  entryjoinQueue ← ∅ {Queue that captures entryItems for on entryjoin}
{Initialization of G_Tree, if modelItem is the end event, then construct root goal and
add sequence node, else construct sequence node and add goal of modelItem as child node}
2.  currentNode ← InitGTree (G_Tree, modelItem)
3.  G_Tree ← SINGLE-GOALTREE-CONSTRUCTION (currentNode, modelItem,
entryjoinQueue)
{Construct single goal trees for each entryjoin}
4.  while (entryjoinQueue not empty) do
5.      goalItem, entryItem ← Enqueue (entryjoinQueue)
6.      G_Tree ← G_Tree-CONSTRUCTION (modelItem)
7.      Merge resulting G_Tree with goalItem {Merge single goal trees to one goal tree}
8.  return currentNode SINGLE-GOALTREE-CONSTRUCTION (currentNode, modelItem, entryjoinQueue)
Input:   currentNode, modelItem, entryjoinQueue
Output:  partial G_Tree for sEPC_split {break condition for recursion}
9.  if (isNil (modelItem) or isVisited ( modelItem) or not
allSuccessorsVisited (modelItem))
        then
        not all paths have been processed, set new sequence node for next path}
10. if (isSplitConnector (modelItem) then
11.     set currentNode to parentNode of currentNote
12.     InsertSequenceNode (currentNode) {adds Sequence Node to current Node}
13.     return {Trace back to join Connector}
    {all paths have been processed trace back to connector's parent node}
14. if (IsSplitConnector (modelItem) then
15.     set currentNode to parentNode of parent of currentNode
16. else if (isjoinConnector (modelItem) then {insert decomposition node in tree}
17.     insertDecompositionNode (currentNode, modelItem)
18.     InsertSequenceNode (currentNode)
19. else if (isEntryjoinConnector (modelItem) then
        {entryjoin may have more than one entryItem}
20. insertDecompositionNode (currentNode)
21.     for all (entryItem of modelItem) do
22.         insertSequenceNode (currentNode)
23.         Enqueue currentNode and entryItem of entryjoin to entryjoinQueue
24.     set currentNode to parentNode of parent of currentNode
25  else
26      insertGoalNode (currentNode, modelItem)
27. set visited flag of modelItem to true
28. for all (predecessors of modelItem) do
29.     if (not isEntryConnector (modelItem) then
30          GTree ← SINGLE-GOALTREE-CONSTRUCTION (currentNode, modelItem,
            entryjoinStack)
31. set currentNode to root node of constructed GTree
32. return currentNode
```

FIG 18B
Step 3 (line 26)
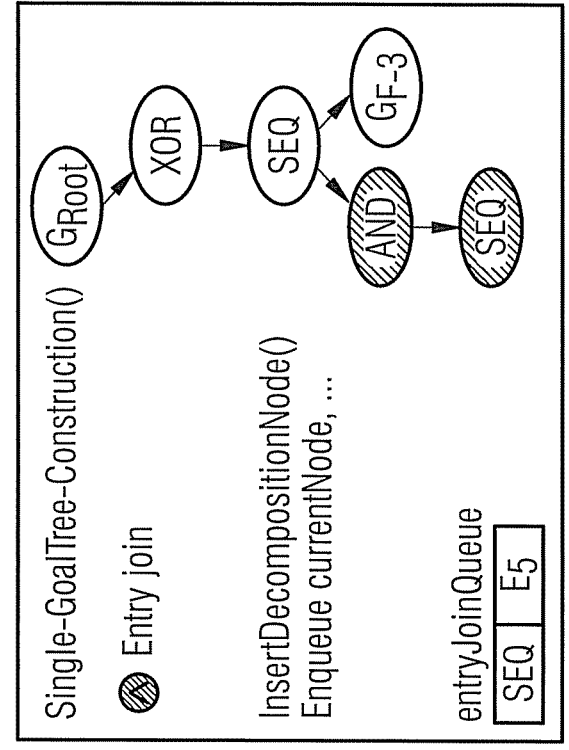
Step 4 (line 19-24)
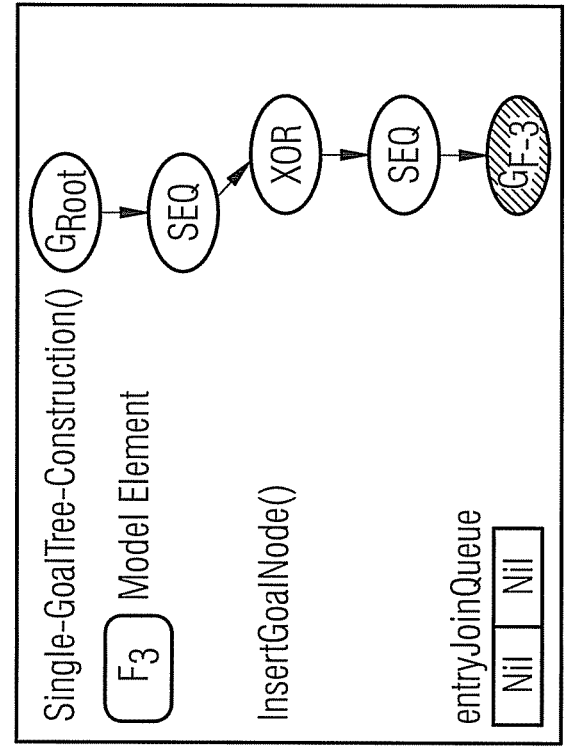

FIG 18C
Step 5 (line 26)
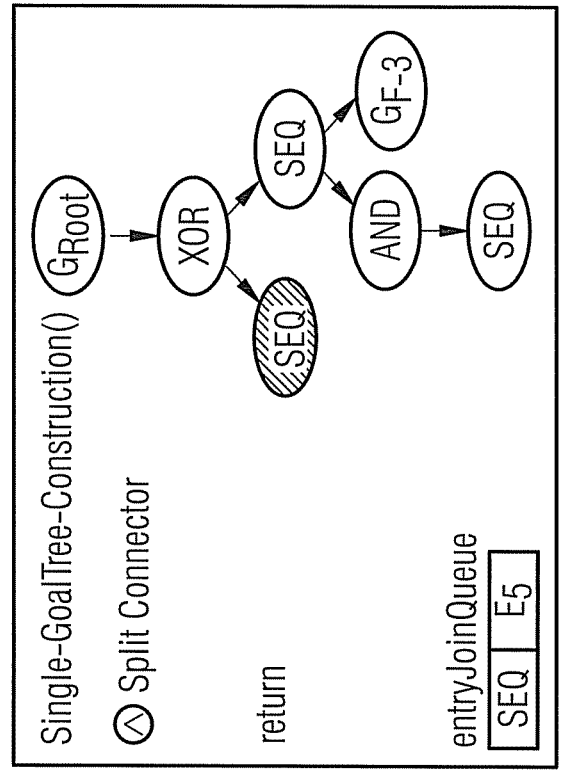
Step 6 (line 9-13)
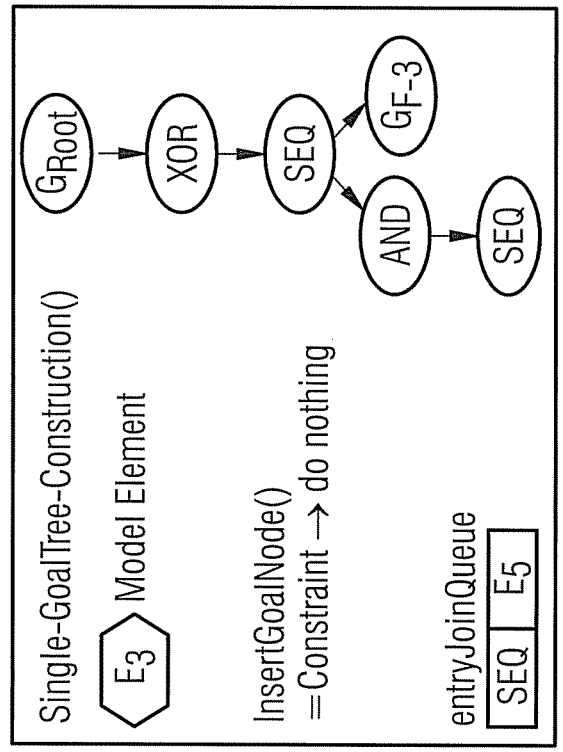

FIG 18D
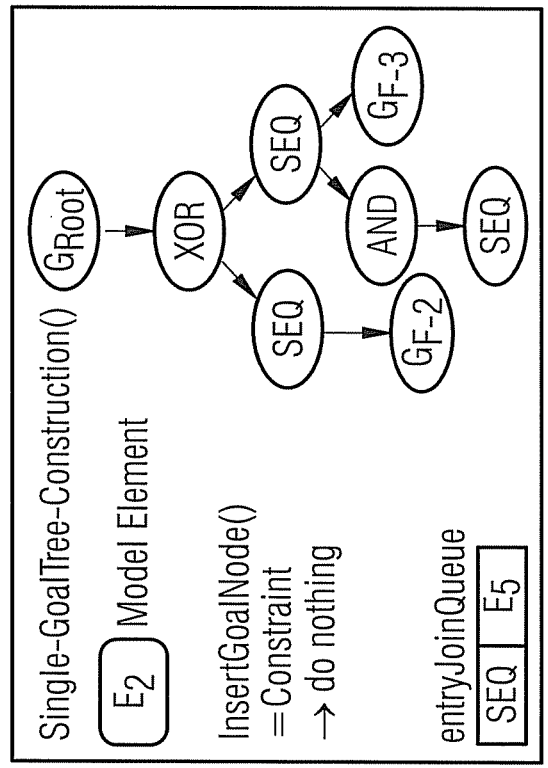
Step 8 (line 26-30)
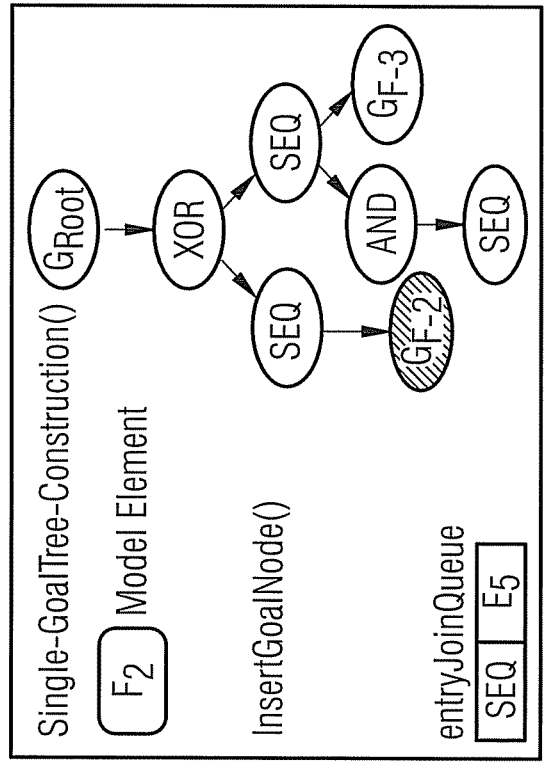
Step 7 (line 26-30)

FIG 18E
Step 9 (line 26-30)
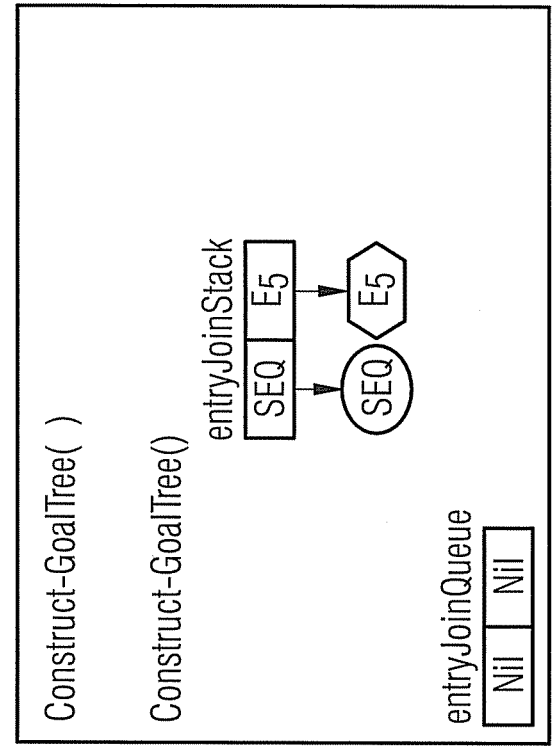
Step 10 (line 4-6)
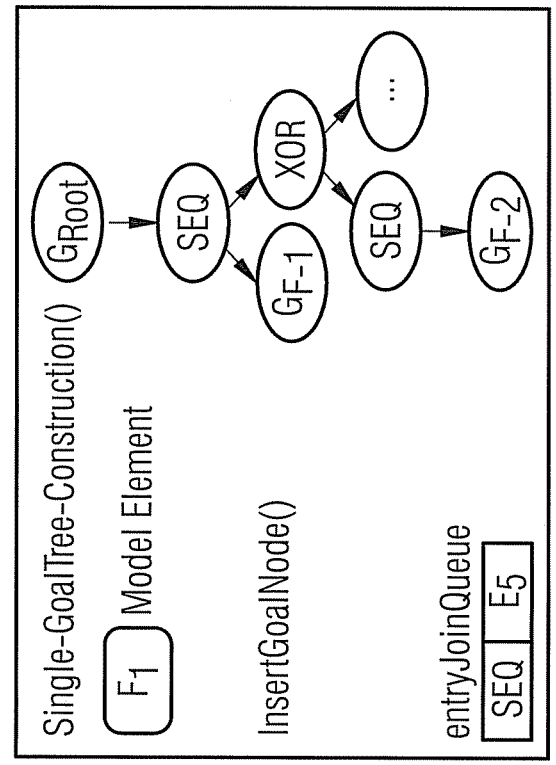

FIG 18F
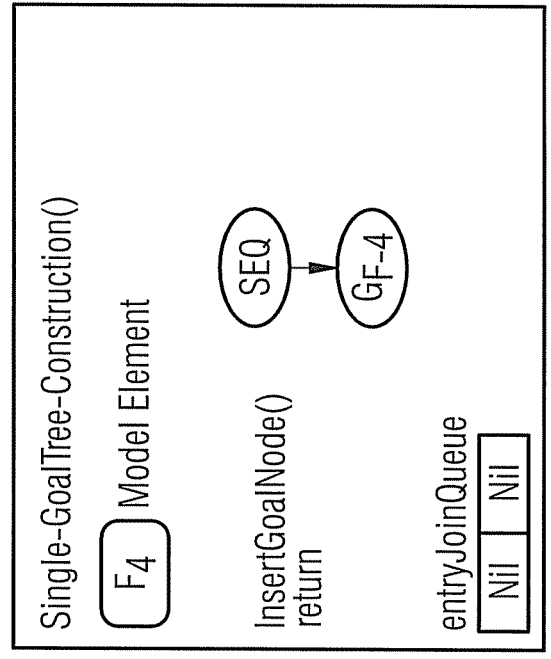
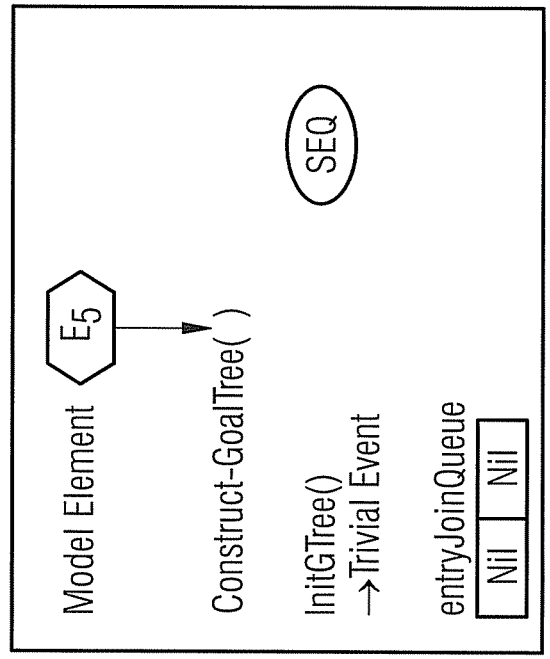

METHOD AND AN APPARATUS FOR AUTOMATIC EXTRACTION OF PROCESS GOALS

The invention relates to a method and an apparatus for automatic extraction of process goals from a semantically annotated structured process model comprising model elements named by natural language expressions.

TECHNICAL BACKGROUND

In organizations processes are described by comprehensive process designs. A business process is a set of coordinated activities, conducted by both humans and technical resources, with the objective to achieve a specific goal. Process designs are represented as process models in a particular modelling language, usually depicted by a graph of activities and their causal dependencies.

Besides a documentation of existing processes, the design of process models may have several, additional motivations that can be clustered into motivations that accomplish the organizational design or the development of information technology systems. Process descriptions support process design by enabling the identification of flaws in existing processes, by optimizing and by monitoring existing processes. Concerning the design of an IT-Infrastructure, process models play a vital role for the specification and configuration of software systems. Another important role denotes the usage for workflow management systems wherein process models specify executable workflows.

Hence, process models are input for semantic analysis activities that address organizational or information technology aspects. Semantic analysis activities comprise the comparison of process models, the calculation of process model metrics, the extraction of a common sense process vocabulary and queries on process models.

The comparison of process models is a semantic analysis activity which addresses the identification of similar or equal process activities in process descriptions. Model comparison can be used to specify a metric that defines a similarity measure between reference processes and organizational specific processes, for example. Reference processes describe common or best practice process solutions. Further, the comparison of process models enables to identify structural analogies in process models that may be an indicator for process patterns.

The calculation of process model metrics is performed to calculate model metrics which can be used to determine a process model quality by calculating a measure that determines the complexity. The model complexity can be defined by a number of logical connectors, a number of different activities, relationships between input and output objects, or a number of different roles associated with process activities.

In large organizations, the design of process models is realized by a number of process modelers. This implies a certain subjectivism concerning the naming of activities and information objects by using synonyms, not standardized abbreviations, for example.

Queries on process models enable answers to question such as:
Which activity is triggered by a certain event?
How is an activity decomposed into sub-processes?
Which roles are involved in a certain activity?
What is the required input, the delivered output of a process activity?
What are the preconditions necessary to perform a specific activity?

Such semantic analyses of process models can be conducted manually by human experts or can be performed automatically. Automated semantic analyses require a machine-readable process description with a formalized semantics of the model structure, the process elements and its descriptions.

One of the most popular process modelling language denotes the Event-driven Process Chain (EPC) modelling language. It has gained a broad acceptance and popularity both in research and in practice. An EPC Model is a directed and connected graph whose nodes are events, functions and logical connectors which are connected by control flow arcs. Functions represent the time and cost consuming elements by performing tasks on process objects (e.g. the task "Define" is performed on the Process Object "Software Requirements"). Each function has exactly one ingoing and one outgoing arc. Further, a function transforms a process object from an initial state into a resulting state captured by events that represent the passive elements. The state information is also bound to a text phrase (e.g. "Requirements Defined"). Each event has at most one ingoing and at most one outgoing arc. A connector can be either an AND-, an OR-, or an XOR-connector. A connector has multiple ingoing arcs and one outgoing arc (join), or it has one ingoing arc and multiple outgoing arcs (a split).

Conventional EPC model can be annotated as follows:
N is a set of nodes and $A \subset N \times N$ is a binary relation over N, the arcs. Each node $n \epsilon N$ has a set of ingoing arcs $n_{in}=\{(x,n)|(x,n)\epsilon A\}$ and a set of outgoing arcs $n_{out}=\{(x,y)|(x,y)\epsilon A\}$.

An EPC Model is formally defined by a tuple M=(E, F, C, l, A, n, id) consisting of
three pairwise disjoint sets E (Event), F (Function), and C (Connector),
a mapping $l: C \to \{and, or, xor\}$ and
a binary relation of control flow arcs
$A \subset (E \cup F \cup C) \times (E \cup F \uparrow C)$ such that
$|e_{in}| \leq 1$ and $|e_{out}| \leq 1$ for each $e \epsilon E$,
$|f_{in}|=|f_{out}|=1$ for each $f \epsilon F$, and
either $|c_{in}|>1$ and $|c_{out}|=1$ or $|c_{in}|=1$ and $|c_{out}|>1$ for each $c \epsilon C$
a function $n:(E \cup F) \to$ String that is the name for an event or function
a function $id:(E \cup F) \to$ Integer that is a unique identifier for an event or function The following sets of connectors are defined:
Split Connectors:

$$\wedge C_{as}=\{c \epsilon C | l(c)=and \wedge |c_{in}|=1\}$$

$$\vee C_{os}=\{c \epsilon C | l(c)=or \wedge |c_{in}|=1\}$$

$$\times C_{xs}=\{c \epsilon C | l(c)=xor \wedge |c_{in}|=1\}$$

Join Connectors:

$$\wedge C_{aj}=\{c \epsilon C | l(c)=and \wedge |c_{out}|=1\}$$

$$\vee C_{oj}=\{c \epsilon C | l(c)=or \wedge |c_{out}|=1\}$$

$$\times C_{xj}=\{c \epsilon C | l(c)=xor \wedge |c_{out}|=1\}$$

Further, EPC models consider the following additional syntactical restrictions:
each EPC starts and ends with one or more events,
an EPC contains at least one function,
an EPC can be composed of several EPCs,
an event cannot be the predecessor or the successor of another event,
a function cannot be the predecessor or the successor of another function, each OR-split and each XOR-split connector should be preceded by a function, there should be no cycle of control flow that consist of connector nodes only.

FIG. 1 illustrates an example for a conventional EPC model. It consists of seven EPC-Events and five EPC-Functions whose control flow considers the following split connectors: one "or" one "and" and one "xor", and the following split connectors: one "and" and one "xor". The EPC-Function with the ID "03" is named with by the string "Define Software Requirements With Customer". Further, the model has two start events, namely "software Project Authorized" and "Customer Received". This means, that the succeeding functions will be executed if at least one or both of the two events occur. This logic is implied by the "or' join connector. The model concludes with the endevent "Software Development Project Planned". This means that the described process achieves the state "Planned" for the process object "Software Development Project".

Using conventional EPC models for process descriptions as a basis for automatable semantic analysis activities faces one significant problem. EPC models are semi-formal process descriptions. This means that the implicit semantics of names for EPC-Functions and Events is bound to natural language expressions. The EPC modelling language suggests naming conventions or guidelines that specify the syntax for text clauses used for naming EPC-Functions and Events. Main objective of naming conventions is to specify syntactical rules that must be complied in order to reduce the subjectism of process modelers. Thus naming conventions care for a standardization regarding the naming of EPC-Functions and Events.

Hence, semantic analyses of EPC models require to resolve in a first step the meaning of names that can be understood by a computer. Resolving addresses the identification of relevant process information and its associated meaning implicitly captured by a name. To achieve a unique meaning of the names that describe EPC-Functions and Events, they can be semantically annotated. Semantic annotation links each EPC-Function and Event to entries of a process knowledge base that captures the semantics of used names.

As a further example "Define Software Requirements with Customer" is a possible name for an EPC-Function. This name consists of the task "Define" that is performed on the process object "Software Requirements". The process object "Software Requirements" is a specialization of the general process object "Requirements". The process object "Customer" indicates a parameter for that task, since this task is performed in a cooperate manner with a customer. If the name would be "Define Software Requirements for Customer" then the parameter has a different meaning since the customer indicates the target of the performed activity.

Organizations have to pay much attention to organize and optimize the business process. Process description in event driven process change (EPC) has gained abroad acceptance and popularity both in research and in industrial applications. EPC models can describe processes on a management and organizational level. Model element structure can be expressed in terms of meta language constructs such as functions, events and connectors. Natural language expressions describe the implicit meaning of functions and events forming model elements of the process model.

During design or adaptation of business processes, process modellers wish to have access to proven pattern solutions implicitly modelled in already existing EPC models.

Accordingly, it is an object of the present invention to provide a method and an apparatus for automatic extraction of process goals which allows process modellers to use proven patters solutions for process designs.

SUMMARY OF THE INVENTION

The invention provides a method for automatic extraction of process goals from a semantically annotated structured process model comprising model elements named by natural language expressions and annotated with semantic linkages to a reference process antology comprising the steps of:
(a) splitting said process model having at least one end event into partial process models provided for each end event of said process model;
(b) annotating the model elements of each partial process model with a process goal extracted from said model element; and
(c) decoupling of the process goals from each annotated partial process model to generate a hierarchical process goal tree for each annotated partial process model.

The method according to the present invention assists process modellers in constructing high quality process solutions. The extraction of process goals from given process models facilitates the re-use of proven process solutions.

In an embodiment of the method according to the present invention, each process goal is formed by at least a process object and a state of said model element.

In an embodiment of the method according to the present invention each process goal is formed by an identifier, a process object, a state of said process object and a constraint indicating a precondition with reference to said process object and said state.

In an embodiment of the method according to the present invention each constraint comprises a process object, the state associated with the process object, a value and a type of value.

In an embodiment of the method according to the present invention the process model is formed by an EPC (event process chain) model, a UML (unified model language) model or a petri network.

In an embodiment of the method according to the present invention, a name process element is a function provided for performing a task on a process object to transform the process object from an initial state to a resulting state or an event comprising a text clause.

In an embodiment of the method according to the present invention the annotating of said model elements of each partial process model comprises
    instantiating a process goal for each not trivial event and each function of said process model by exctracting a process object and a state from said named model element and
    associating constraints extracted from events with said instantiated process goals.

In an embodiment of the method according to the present invention global constraints associated with root goals are extracted from the start events of said partial process models and local constraints are associated with goals are extracted from events of said partial process model which capture a result of a preceding decision function of said partial process model.

In an embodiment of the method according to the present invention the decoupling of the process goals from the annotated partial process models is performed by a goal reconstruction algorithm starting with a semantically annotated end event of the respective partial process model.

In an embodiment of the method according to the present invention said referenced process ontology indicates a semantic means of the used natural language expressions in terms of process objects, tasks and states.

The invention further provides a computer system for automatic extraction of process goals from a semantically annotated structured process models stored in a memory,
wherein said process model comprises model elements named by natural language expressions and for instance annotated with semantic linkages to a reference process ontology, wherein said system comprises:
(a) a splitting unit which splits said stored process model having at least one end event into partial process models each provided for a corresponding end event of said process model;
(b) an annotation unit which annotates the model elements of each partial process model with a process goal extracted from said model elements;
(c) a decoupling unit which decouples the process goals from each annotated partial process model to generate a hierarchical process goal tree for each annotated partial process model.

The invention further provides an apparatus for automatic extract of process goals from a semantically annotated structure process model stored in a memory,
wherein the process model comprises model elements named by natural language expressions and annotated with semantic linkages to a reference process ontology, said apparatus comprising:
(a) a splitting unit which splits said stored process model having at least one end event into partial process models each provided for a corresponding end event of said process model;
(b) an annotation unit which annotates the model elements of each partial process model with a process goal extracted from said model elements;
(c) a decoupling unit which decouples the process goals from each annotated partial process model to generate a hierarchical process goal tree for each annotated partial process model.

The invention further provides a computer program with program instructions for executing a method for automatic extraction of process goals from a semantically annotated structure process model comprising model elements named by natural language expressions and annotated with semantic linkages to a reference process ontology comprising the steps of:
(a) splitting said process model having at least one end event into partial process models provided for each end event of said process model;
(b) annotating the model elements of each partial process model with a process goal extracted from said model element; and
(c) decoupling of the process goals from each annotated partial process model to generate a hierarchical process goal tree for each annotated partial process model.

The invention further provides data carrier for storing such a computer program.

DESCRIPTION OF THE ENCLOSED FIGURES

FIG. 9 shows a flow chart of a possible embodiment of the method for automatic extraction of process goals according to the present invention;

FIG. 10 shows an example for extraction of process patterns employed by the method according to the present invention;

Figure 13:
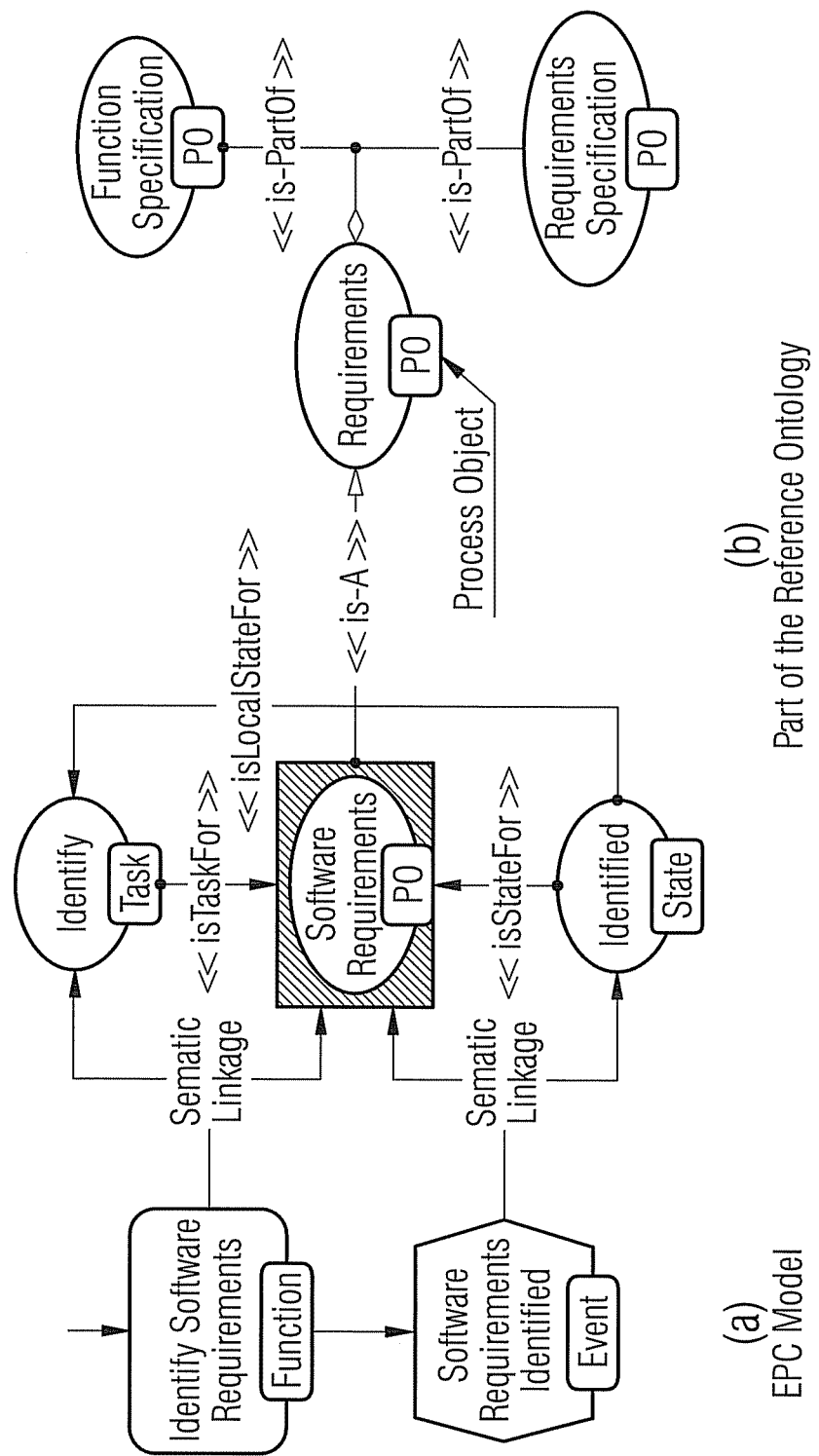
Figure 14:
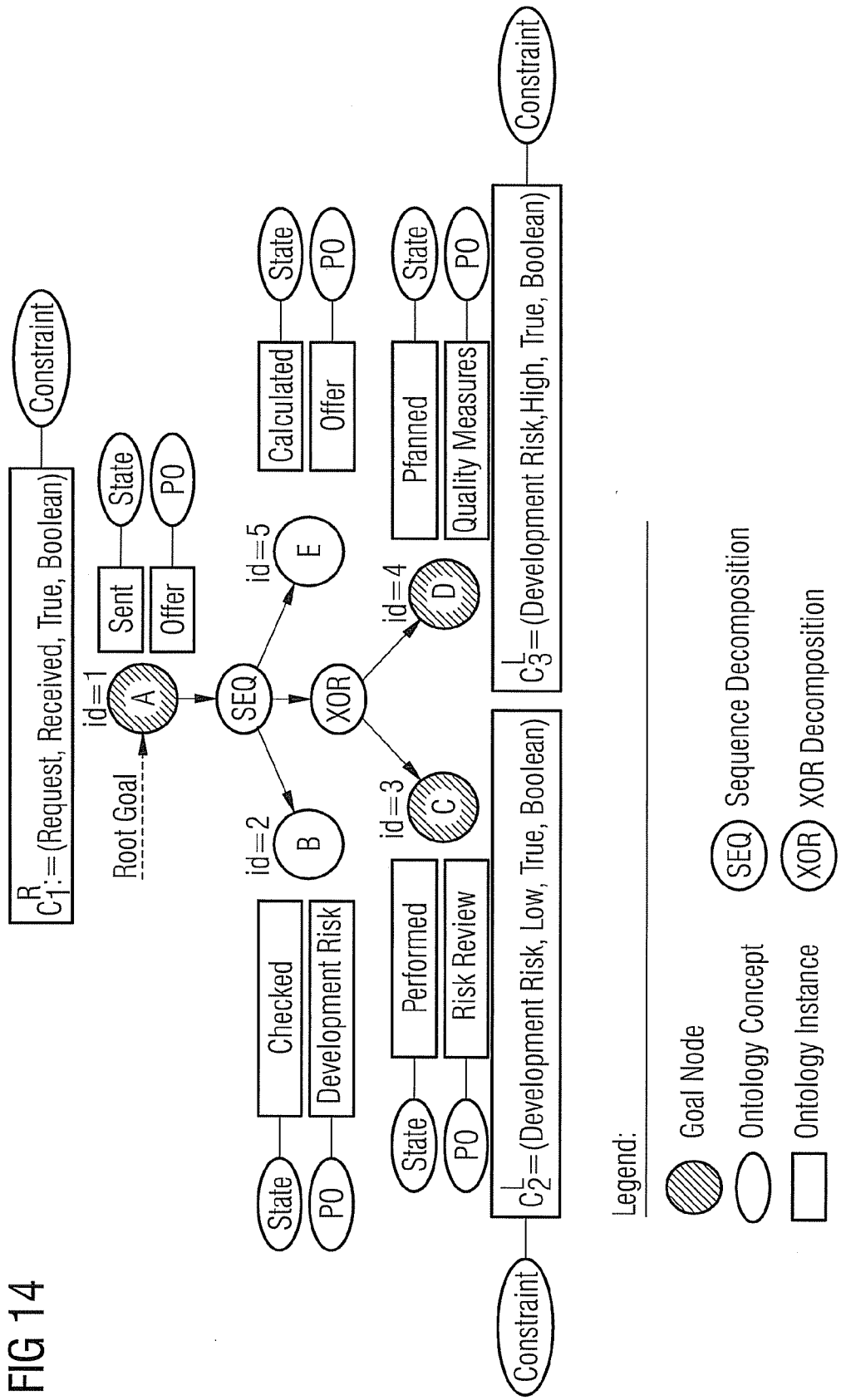
Figure 15:
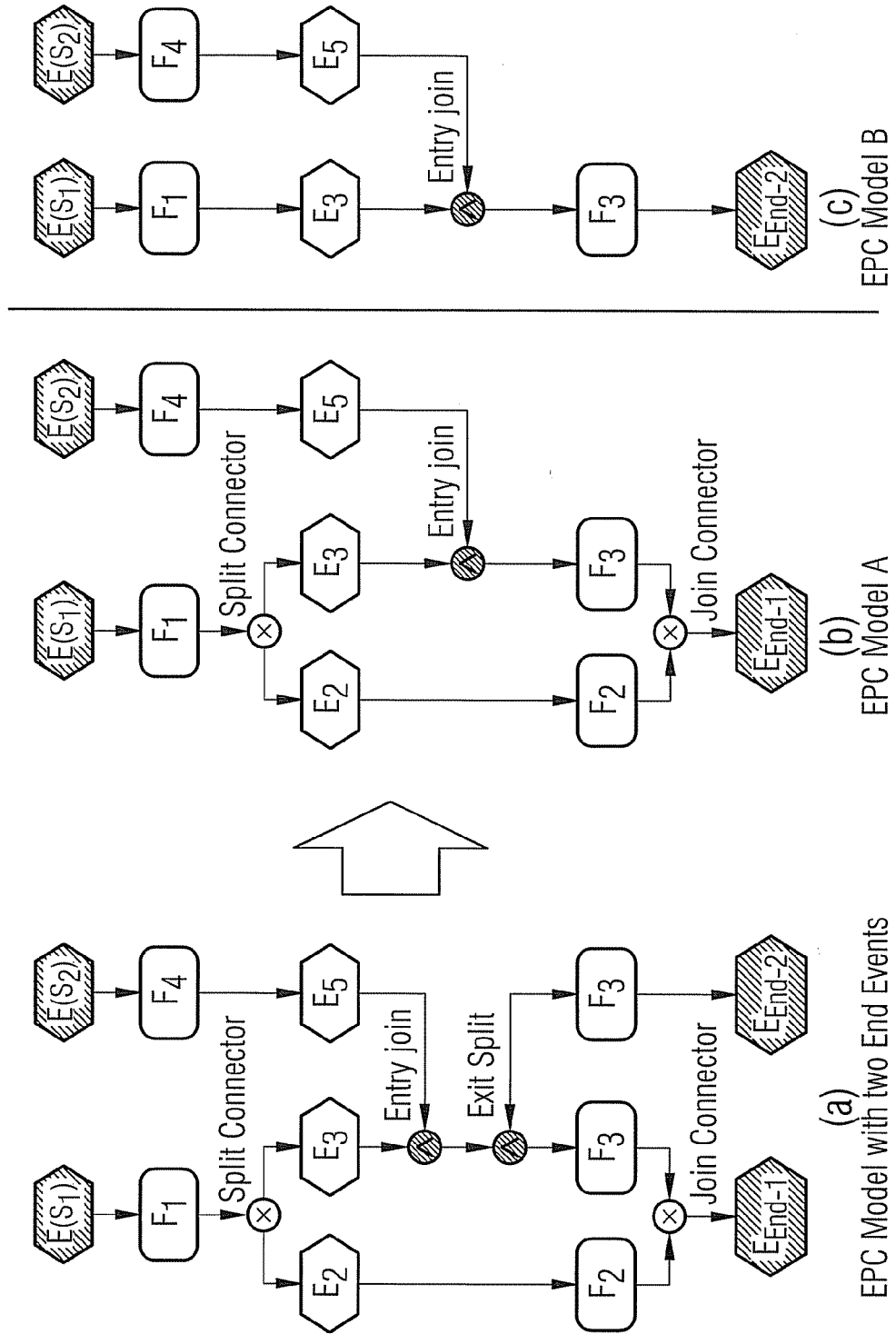
Figure 16:
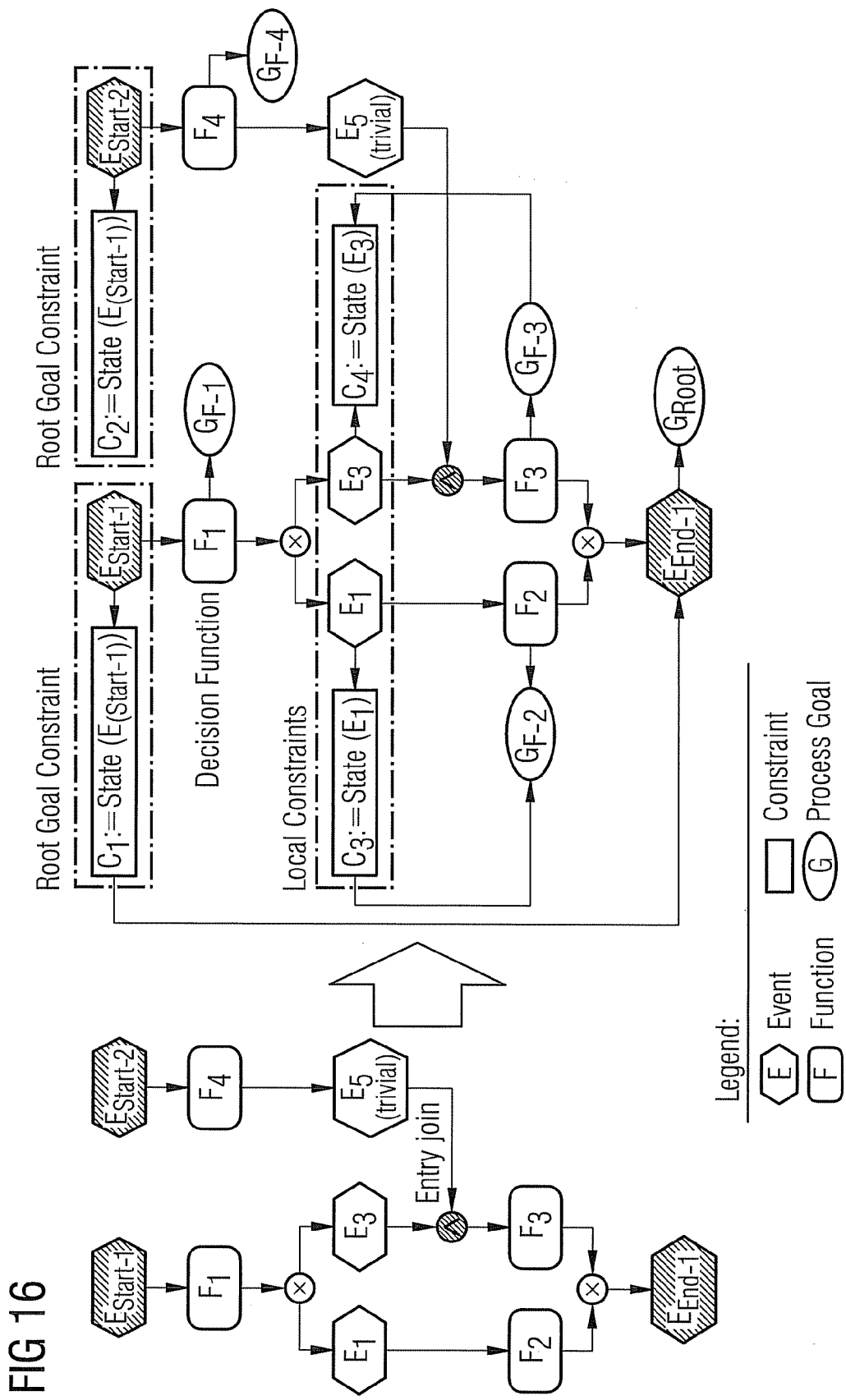
Figure 18A:
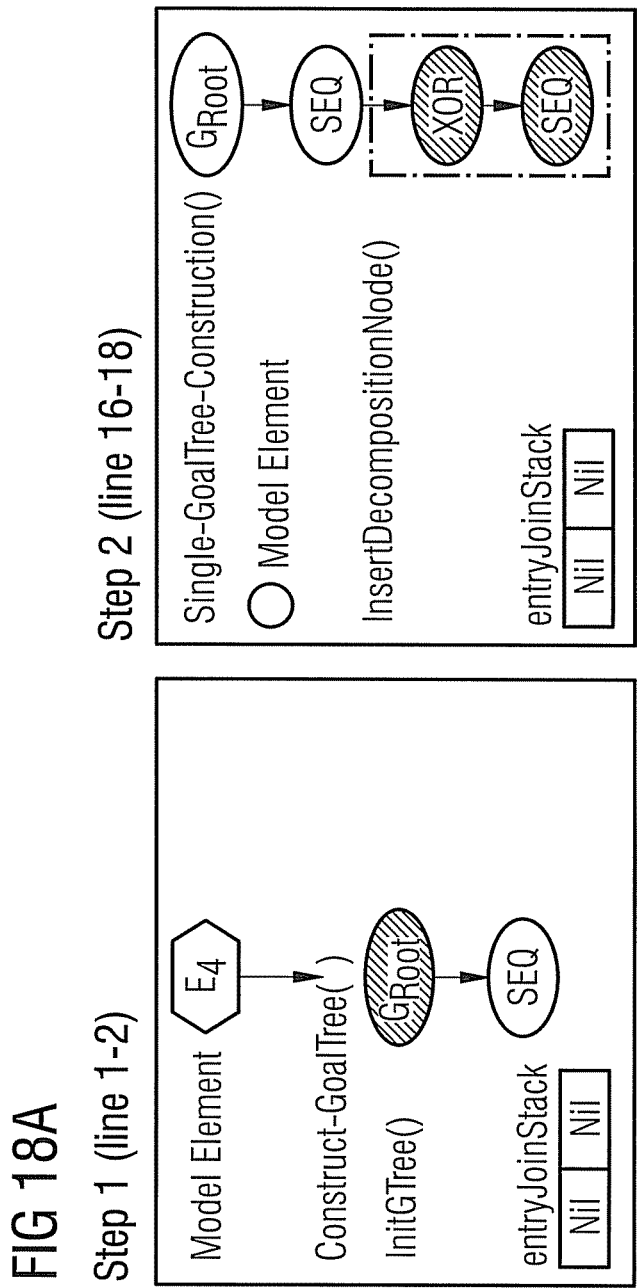
Figure 19:
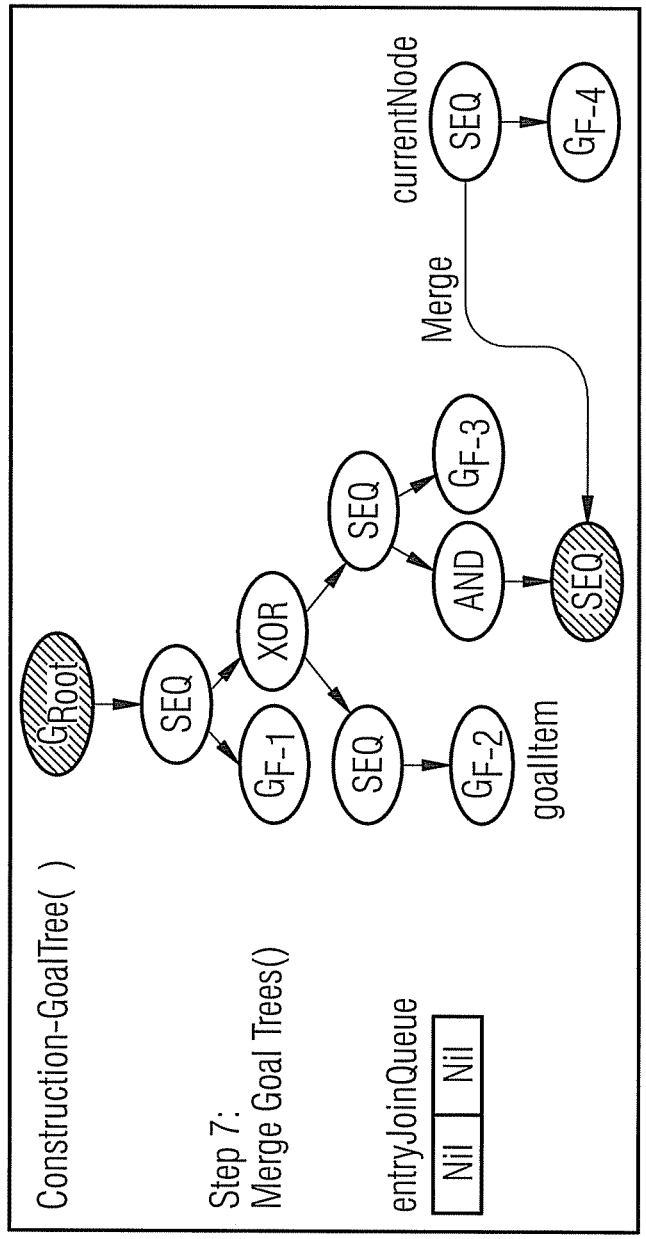

FIG. 11a-g show workflow constructs of a structured EPC process model as employed by the method according to the present invention;

FIG. 12 shows an entry join connector as a workflow construct of a structured EPC process model element as employed by the method according to the present invention;

FIG. 13 shows an example of a semantically annotated EPC process model as employed by the method according to the present invention;

FIG. 14 shows an example of constraints of process goals as employed by the method for automatic extraction of process goals according to the present invention;

FIG. 15 shows an example for performing a splitting of a process model as a first step of the method for automatic extraction of process goals according to the present invention;

FIG. 16 shows an example for annotation of process goals to process elements illustrating a second step of the method for automatic extraction of process goals according to the present invention;

FIG. 17 shows an exemplary embodiment of an algorithm goal tree construction employed for decoupling of process goals from annotated partial process models performed as a third step of the method for automatic extraction of process goals according to the present invention;

FIG. 18a-18e Steps performed by the algorithm shown in FIG. 17 for the exemplary annotated process model shown in FIG. 16;

FIG. 19 shows an example of a hierarchical process goal tree generated by the tree construction algorithm shown in FIGS. 18a-18e.

DETAILED DESCRIPTION OF EMBODIMENTS

In the following, possible embodiments of the method and apparatus for the automatic semantic annotation of a process model, in particular of an EPC process model, are described with reference to the enclosed figures.

Figure 1:
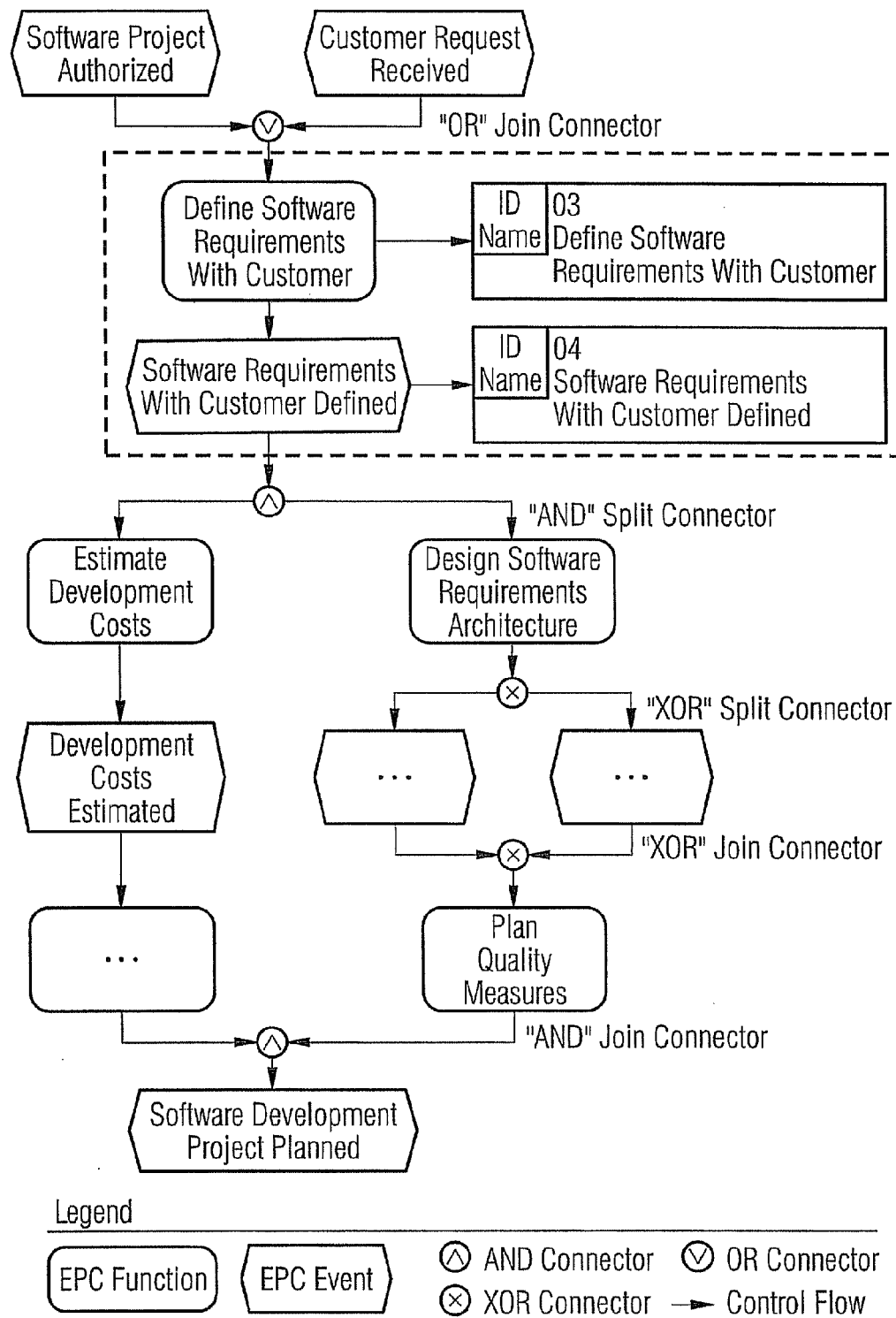
FIG. 1 shows an example of a conventional EPC model according to the state of the art.
Figure 2:
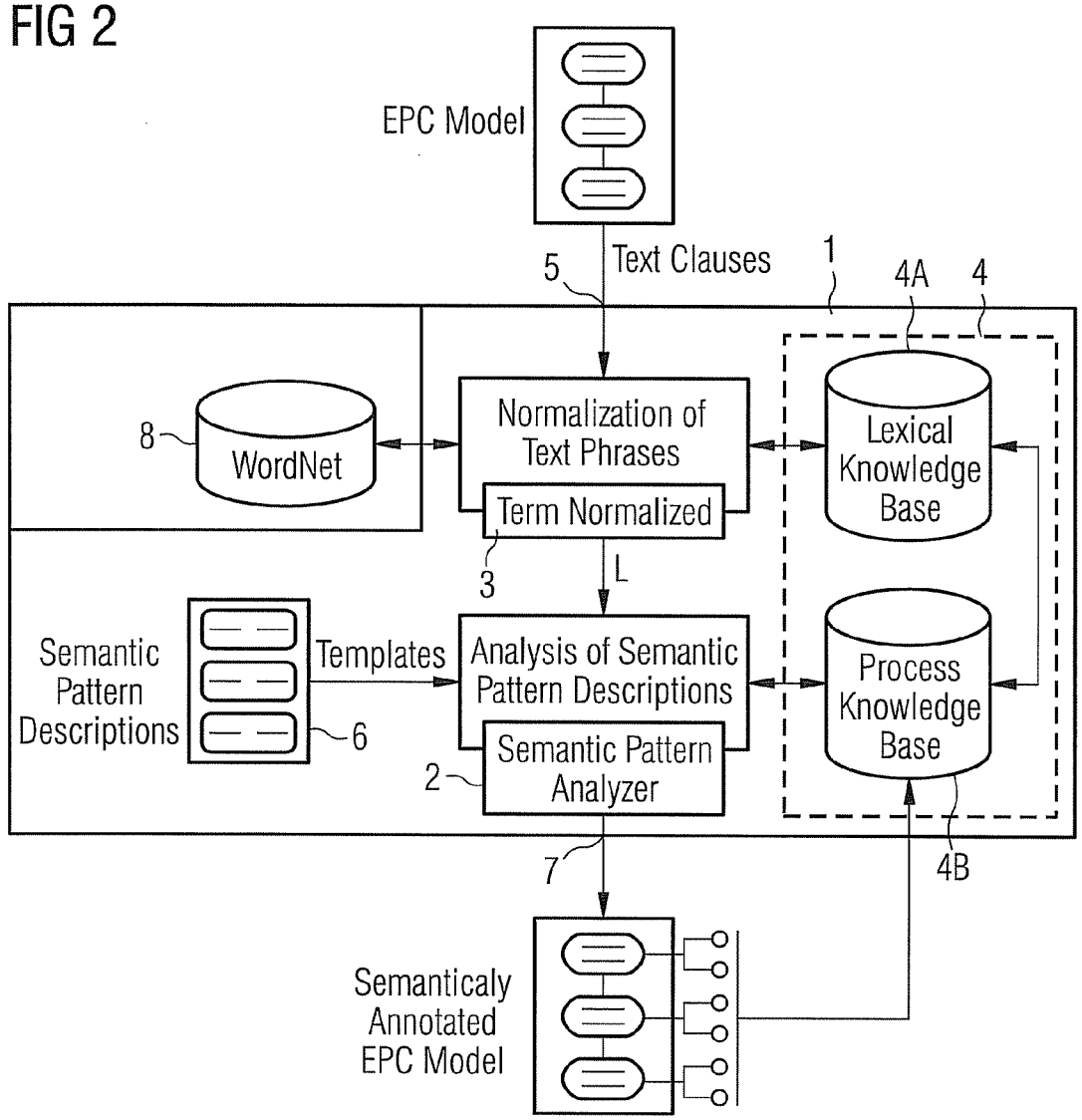
FIG. 2 shows a block diagram of an apparatus for automated semantic annotation of an EPC model which generates a semantically EPC model used by the method and apparatus according to the present invention for automatic extraction of process goals.
Figure 8:
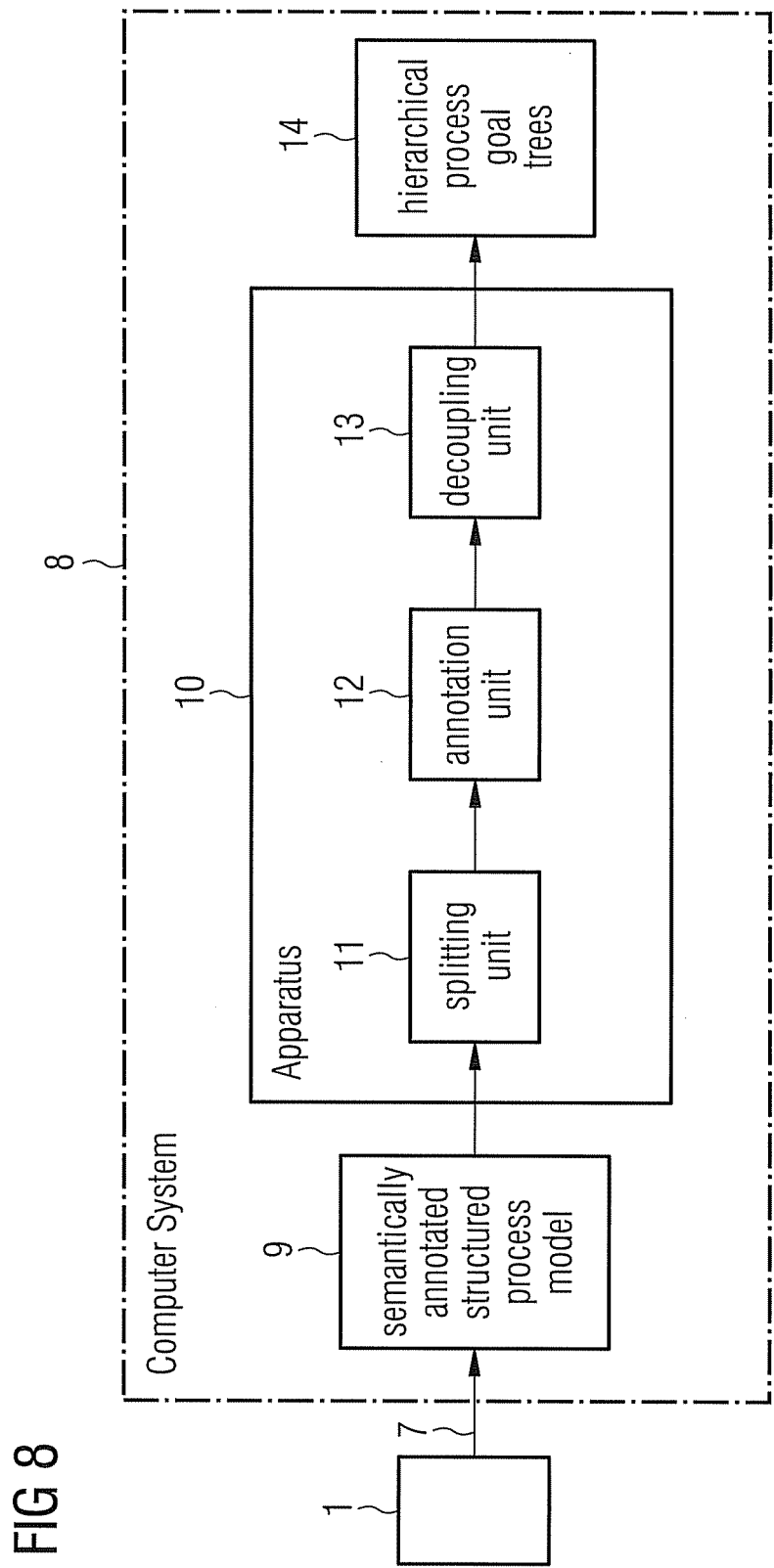
FIG. 8 shows a block diagram of a possible embodiment of a computer system according to the present invention.

FIG. 2 shows a block diagram of an exemplary embodiment of an apparatus 1 for automated semantic annotation of a process model to generate semantically annotated process model which is further processed by a computer system 8 according to the present invention as shown in FIG. 8.

As can be seen in FIG. 2, the apparatus 1 comprises a semantic pattern analyser 2 which analyses the textual structure of a natural language expression on the basis of predefined semantic pattern descriptions to establish a semantic linkage between each model element of a process model to classes and instances of a reference process ontology for generating a semantically annotated process model. As can be seen from FIG. 2 the apparatus 1 further comprises a term normaliser 3 which performs a linguistic normalisation of natural language expressions of named model elements to generate a semantic label for each named model element of said process model. The apparatus 1 according to the embodiment shown in FIG. 2 further comprises a memory 4 for storing the reference process ontology consisting of a lexical knowledge base 4A comprising a vocabulary used for model elements and a process knowledge base 4B comprising process semantics of model elements.

As can be seen in FIG. 2 the apparatus 1 receives at an input interface 5 a process model such as an EPC model. The EPC model comprises model elements named by natural language expressions such as functions and events. The function can be provided for performing a task on a process object to transform the process object from an initial state to a resulting state. The functions or events within the EPC model comprise text clauses. For each named model element such as an event or a function of the process model the linguistic normalisation of its natural language expression is performed by the term normaliser 3 to generate a semantic label L of the respective model element. The term normaliser 3 forwards the label L to the semantic pattern analyser 2. The semantic pattern analyser 2 performs a semantic pattern analysis for each generated semantic label L to generate an ordered set of tuples containing instances of semantic pattern templates by using analysis rules of a semantic pattern description as shown in FIG. 2. Each semantic pattern description comprises a semantic pattern template of a model element a set of template structures and a set of analysis rules.

In a possible embodiment, a semantic pattern template is formed by a domain name and an ordered tuple of variables each pointing to a class of the process knowledge base 4B within the reference process ontology and to instance of the respective class.

In a possible embodiment the template structure is formed by a unique identifier and an ordered tuple of variables each pointing to a class of said process knowledge base 4B within the reference process ontology and to an instance of the respective class.

In a possible embodiment an analysis rule within the semantic pattern description 6 can be formed by a precondition which compares template structures with term structures extracted from natural language expressions and an operator that generates one several instances of semantic pattern templates which are assigned to a model element of the process model.

As can be seen from FIG. 2 the apparatus 1 for automatic semantic annotation performs in a first step a linguistic normalisation of the natural language expressions to generate a semantic label L for each named model element of the process model and then performs a semantic pattern analysis in a second step for each generated semantic label L to establish a semantic linkage between each model element to classes and instances of the reference process ontology stored in the memory 4. The semantic pattern analyser 2 generates the ordered set of tuples containing instances of the semantic pattern templates by using analysis rules of the semantic pattern description 6. The instantiated semantic pattern templates are then assigned to the respective model elements to generate the semantically annotated process model which is output by the apparatus 1 via an output interface 7. In the embodiment shown in FIG. 2 the apparatus 1 processes an EPC model to generate a semantically annotated EPC model. In an alternative embodiment of the present invention the apparatus 1 can process a UML (Unified Model Language) model or a Petri-Network. The apparatus 1 according to the present invention as shown in FIG. 2 can process any kind of process model which comprises model elements named by natural language expressions, i.e. which comprises model elements including text clauses.

The method for a semantic annotation of model elements such as functions and events uses a reference ontology and semantic pattern descriptions. The reference ontology stored in memory 4 provides concepts and relations whose instances capture both the vocabulary (lexical knowledge) used to name Functions and Events and its process semantics (process knowledge). Thus, it servers as a common knowledge base for semantically annotated Functions and Events.

Lexical knowledge stored in the lexical knowledge base 4A comprises morphological and syntactic knowledge about used vocabulary. Morphological knowledge relates to word inflections such as single/plural form of a noun, past tens of verbs. Syntactic knowledge comprises word class information and binary features such as countable/uncountable. Additionally, the lexical knowledge base explicitly considers domain information and relationships such as isAcronymOf and isSynonymTo between entries. Domain information refers to application domains such as software or hardware development.

Process knowledge stored in the process knowledge base 4B represents the semantic domain for used names. The process semantics are expressed by instances of process ontology concepts such as task, process object and its semantic relationships such as isPartOf or isKindOf.

The semantic pattern descriptions 6 consist of template structures that bridge the gap between informal and formal representation. The informal representation refers to vocabulary used by names to describe EPC-Functions and Events, formal representation refer to concepts specified by a reference ontology. The semantic pattern descriptions 6 are either defined for EPC-Functions or for Events.

FIG. 2 depicts the overall architecture of a embodiment of an apparatus 1 for semantic annotation for EPC models. Text clauses are input for the term normaliser 3 that extracts terms and normalizes them by using the lexical knowledge base 4A. The semantic pattern analyzer 2 evaluates the structure of normalized terms against predefined naming conventions that are expressed formally by semantic pattern templates assigned A to the semantic pattern descriptions 6. Thus the semantic linkage between names and entries of the knowledge base is realized by binding knowledge base entries to variables of a semantic pattern template.

The process knowledge base 4B captures the meaning respectively the process semantics of EPC-Functions and Events. Its structure is described by an ontology $O:=(C, \leq_C, R, \sigma)$ that specifies the concepts, relations and axioms for the process knowledge base.

An ontology is a structure $O:=(C, \leq_C, R, \sigma)$ consisting of
two disjoint sets concepts (C) and relations (R) whose elements are called concepts and relations,
a partial order $\leq_C$ on C, called concept hierarchy,
a function $\sigma: R \rightarrow C \times C$, called signature, where
$\sigma(r) = <dom(r), ran(r)>$ with $r \in R$, domain $dom(r)$, and range $ran(r)$, A partial order $\leq_C$ is defined as follows: if $c_1 <_C c_2$, for $c_1, c_2 \in C$, than $c_1$ is a subconcept of $c_2$, and $c_2$ is a superconcept of $c_1$. If $c_1 <_C c_2$ and there is no $c_3 \in C$ with $c_1 <_C c_3 <_C c_2$, then $c_1$ is a direct subconcept of $c_2$, and $c_2$ is a direct superconcept if $c_1$. This is denoted as $c_1 < c_2$.

The schema of the process knowledge base 4B is based on the semantic process elements EPC-Functions and Events. According to the EPC specification, an EPC-Function comprises one or more tasks that are executed on one or more process objects. A process object PO represents a central concept in process modelling. It represents something of interest within a process domain. A task can be performed manually or by a service automatically and can require one or more parameters.

Figure 3:
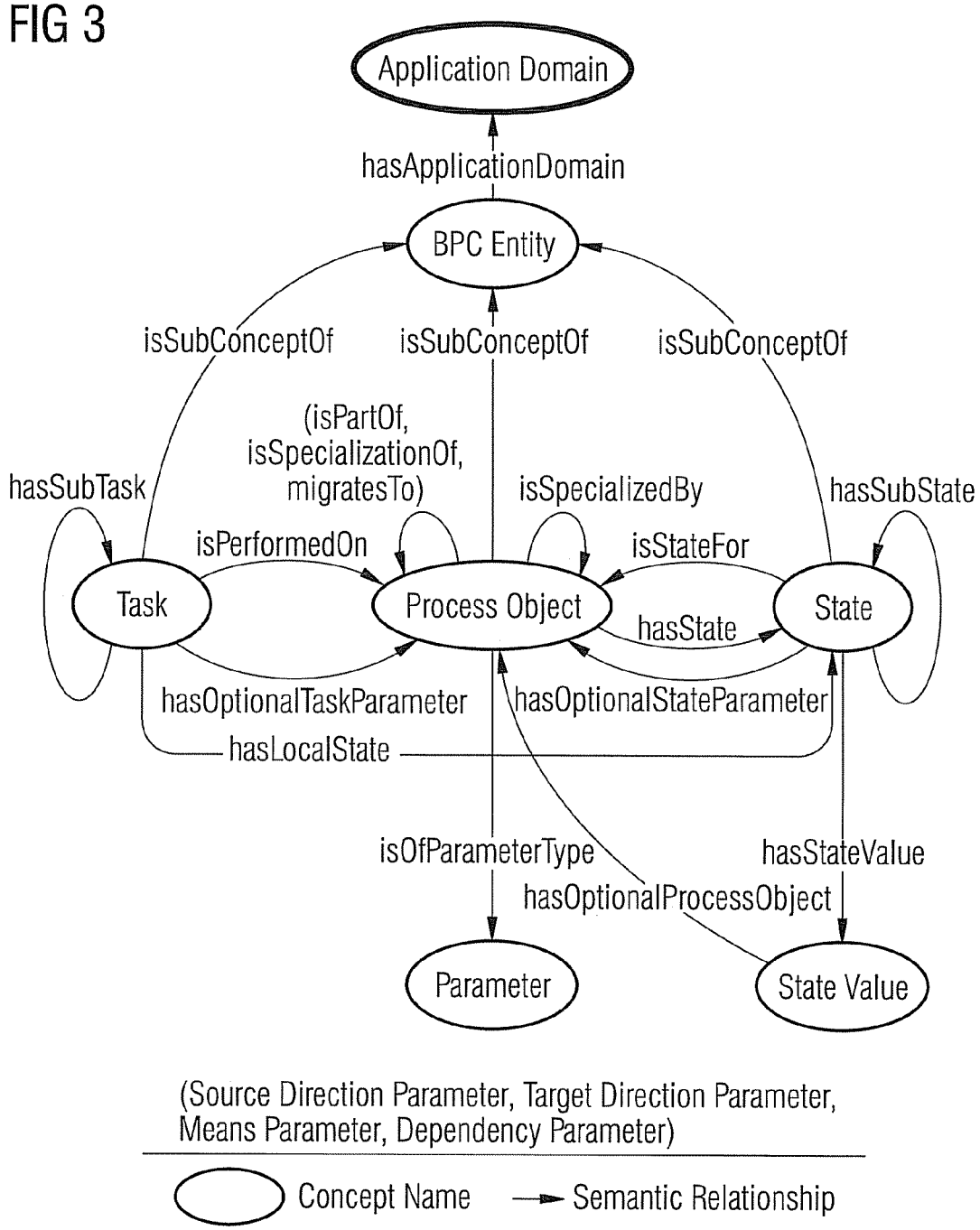
FIG. 3 shows an exemplary process ontology for capturing semantics of a process model as employed by the apparatus shown in FIG. 2.

FIG. 3 depicts a possible process ontology that has a structure $O_{Pro}:=(C_{Pro}, \leq_{CPro}, R_{Pro}, \sigma_{Pro})$ consisting of:

Concepts $C_{Pro}$:
  {ApplicationDomain, EPCEntity, Task, ProcessObject, State, Parameter, StateValue}
Concept Hierarchy $\leq C_{Pro}$:
  {(EPCEntity,ApplicationDomain), (Task,EPCEntity), (ProcessObject,EPCEntity), (State,EPCEntity)}
Relations $R_{Pro}$:
  {hasApplicationDomain, hasSubTask, isPerformedOn, hasOptionalTaskParameter, isPartOf, migratesTo, isSpecifiedBy, isSpecializationOf, isStateFor, hasState, has Substate, isOfParameterType, hasOptionalStateParameter, hasLocalState, hasStateValue)}
Signature of Relations $\sigma_{Pro}$:
  {hasApplicationDomain→(EPCEntity, ApplicationDomain),
  hasSubTask→(Task, Task),
  isPerformedOn→(Task, ProcessObject),
  hasOptionalTaskParameter→(Task, ProcessObject),
  isPartOf→(ProcessObject, ProcessObject),
  migratesTo→(ProcessObject, ProcessObject),
  isSpecifiedBy→(ProcessObject, ProcessObject),
  isSpecializationOf→{ProcessObject, ProcessObject),
  isStateFor→(State, ProcessObject),
  hasState→(ProcessObject, State),
  hasOptionalStateParameter→(State, ProcessObject),
  hasOptionalProcessObject→(StateValue, ProcessObject),
  hasStateValue→(State,StateValue),
  isOfParameterType→(ProcessObject, parameter)}

An application domain as shown in FIG. 3 is an overall name for a domain a process is associated with such as a process for software development. The concept EPCEntity is classified either into a Task (e.g. "Define"), a Process Object (e.g. "Software Requirements") or a State ("Identified=True) concept. A Task can be performed electronically by a service (e.g. Web Service) for achieving a desired objective. It can be specified at different levels of abstraction, refinements or specializations that are expressed by the semantic relationship hosSubTask.

A Process Object as shown in FIG. 3 represents a real or an abstract thing being of interest within a process domain. The concept for describing a Process Object has the semantic relations isPartOf, isKindOf and migratesTo. The semantic relationship isSpecilizedBy refers to a process object, if the following two conditions hold (1) a process object is kind of a more abstract process object and (2) the process object is specialized by another process object.

A State as shown in FIG. 3 refers to a Process Object indicating the state that results from performing a Task on a Process Object. State information indicates an attribute (isAttribute) for a Process Object with an assigned attribute value captured by the concept State Value.

A Parameter indicates a Process Object that may be relevant for a task execution or a state description. The concept Parameters comprises a finite set of parameter instances such as Source Direction Parameter, Target Direction Parameter, Means Parameter, Dependency parameter.

The process knowledge base is a structure
$KB_{Pro}:=(O_{Pro}, I_{Pro}, i_{C_{Pro}}, i_{R_{Pro}}, id_{Pro}, n_{Pro})$ consisting of
  $O_{Pro}$ as defined above,
  a set $I_{Pro}$ whose elements are called instance identifiers (or instances for short), a function $i_{CPro}: C_{Pro} \to (I_{Pro})$, called concept instantiation,
  a function $i_{RPro}: R_{Pro} \to (I_{Pro}^2)$ with $i_{RPro}(r_{Pro}) \subset i_{Pro}(\text{dom}(r_{Pro})) \times i_{CPro}(\text{ran}(r_{Pro}))$, for all r∈R. The function $i_{RPro}$ is called relation instantiation,
  a function $id_{Pro} \to$ Integer where $id_{Pro}$ indicates a unique identifier for an instance,
  a function $n_{Pro}: I_{Pro} \to I_{Lex}$ where $n_{Pro}$ is the instance name, mapped to a root entry of the lexical knowledge base.

Figure 4:
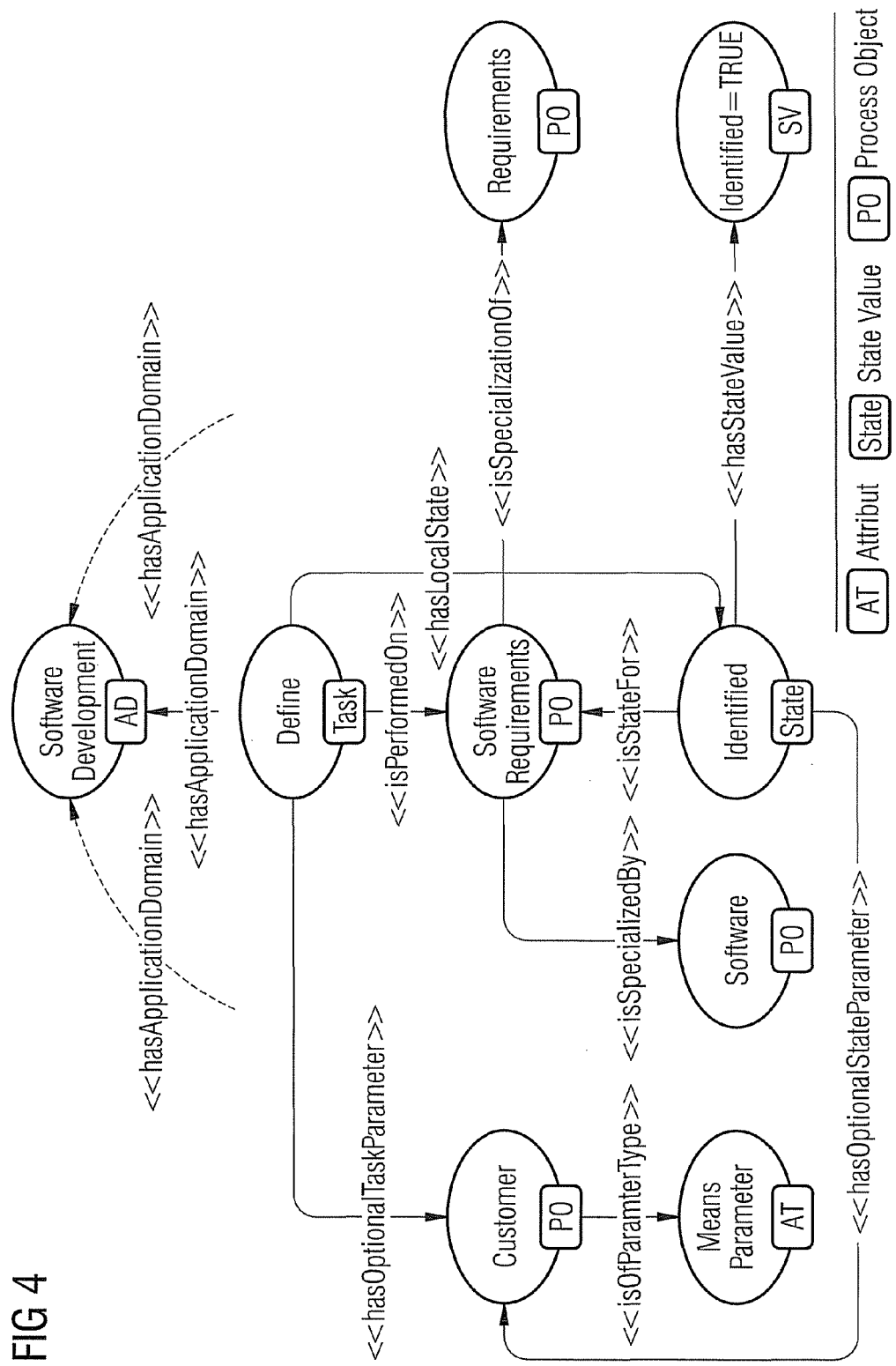
FIG. 4 shows an exemplary embodiment of the process knowledge base as employed by the apparatus shown in FIG. 2.

FIG. 4 illustrates an example for knowledge base entries that capture the meanings of the text clause "Define Software Requirements With Customer" used for naming an EPC-Function and "Software Requirements Defined With Customer" used for naming an EPC-Event.

Process Knowledge Base Entries $I_{Pro}$:
  {Software Development, Define, Customer, MeansParameter, Software Requirements, Software, identified, identified=True, Requirements)
Instantiated Concepts $i_{CPro}$:
  (ApplicationDomain→{Software Development},
  Task→{Define},
  ProcessObject→{Customer},
  Parameter→{MeansParameter},
  ProcessObject→{Software Requirements, Software, Requirements},
  State→{identified},
  StateValue→{identified=True}),
Instantiated Relations $i_{Pro}$:
  (hasApplicationDomain→{(Define, Software Development), (Customer, Software Development), ... }
  isperformedOn→{(Define, Software Requirements)},
  hasOptionalTaskParameter→{(Define, Customer)},
  isSpecifiedBy→{(Software Requirements, Software)},
  isSpecializationOf→{(Software Requirements, Requirements)},
  isStateFor→{(identified, Software Requirements)},
  hasState→{(Software Requirements, identified)},
  hasOptionalStateParameter→{(identified, Customer)},
  hasStateValue→{(identified, identified=True)},
  isOfParameterType→{(Customer, MeansParameter)})
Unique identifiers for instantiated Concepts $id_{Pro}$:
  {Software Development→(1), Define→(2), Customer→(3), Software Requirements→(4), Software→(5), Identified→(6), Requirements→(7)}
Names for Instantiated Concepts $n_{Pro}$:
  {Software Development→("Software Development"), Define→("Define"), Customer→("Customer"), Software Requirements→("Software Requirements"), Software→("Software"), Identified→("Identified") Requirements→("Requirements").

The rationale behind the lexicon is, i.e. a lexical knowledge base 4A, to provide a lightweight, controlled domain vocabulary for naming entries of the process knowledge base $KB_{Pro}$. Lexical knowledge comprises morphological and syntactic knowledge of vocabulary used for naming entries of the process knowledge base 4B. Morphological knowledge relates to word inflections such as single/plural form of a noun, active and passive of verbs. Syntactic knowledge comprises word class information and binary features such as countable/uncountable.

Publicly available resources such as WordNet database 8 as shown in FIG. 2 may provide commonsense vocabulary. In general, such open world dictionaries can comprise several hundred thousand open world entities and semantic relationships. A domain specific controlled vocabulary may comprise only several hundred entities that can be maintained easier.

Figure 5:
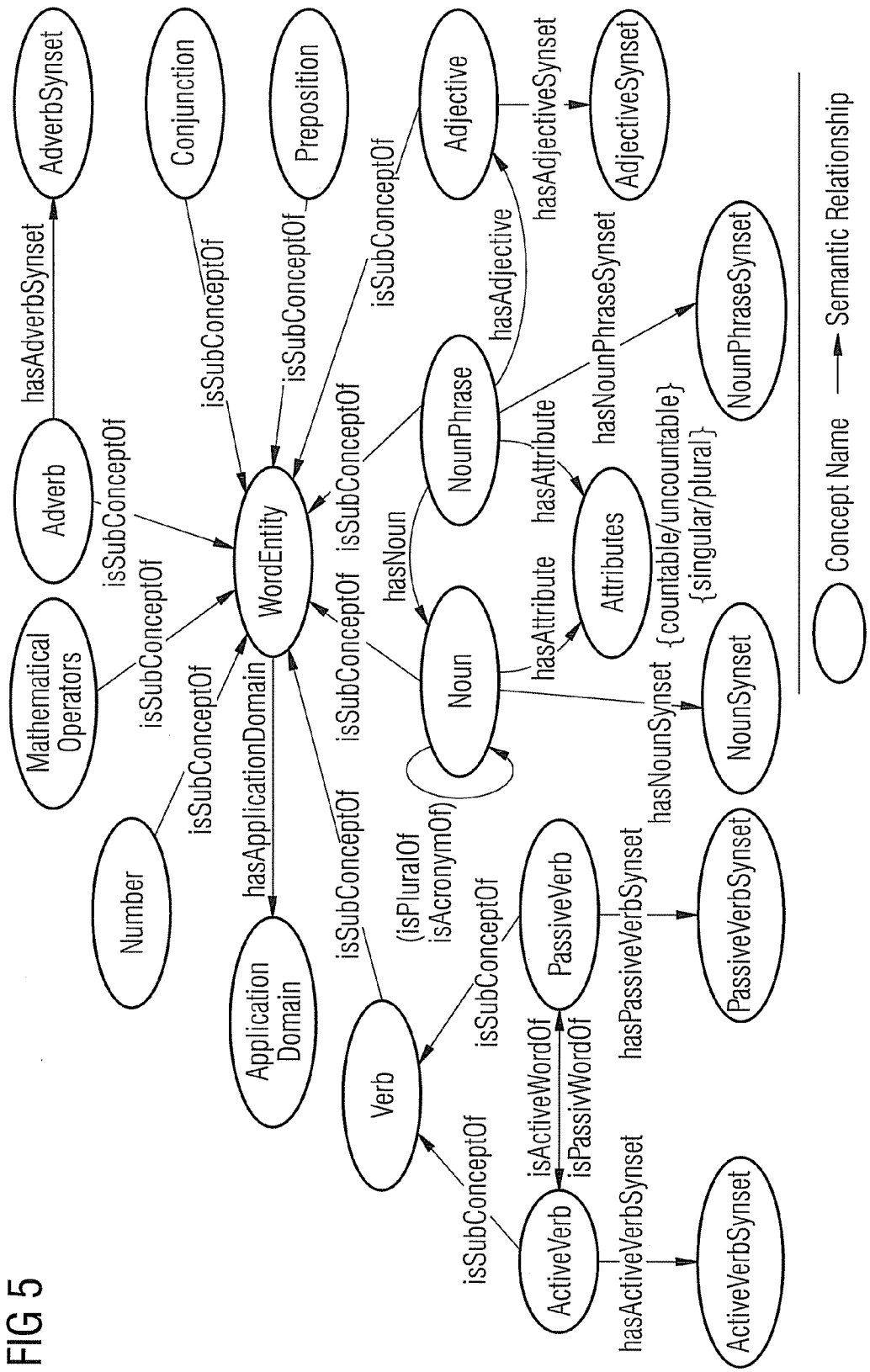
FIG. 5 shows concepts and relations of a lexical knowledge base as employed by the apparatus shown in FIG. 2.

The lexicon ontology is an ontology as defined above. Further, lexical concepts are mapped to process ontology concepts and lexical entries are mapped to process knowledge base entries. Therefore, a lexicon ontology is a structure $O_{Lex}$:
=$(O,M_C,M_I)$ where $M_C$ is a set of concept mappings such that
$m_{Ci} \epsilon M_C:C_{Lex} \rightarrow C_{Pro}$ called predefined mapping of concepts between lexicon and process knowledge base, $M_I$ is a set of instance mappings such that $m_{Ii} \epsilon M_I$: $I_{Lex} \rightarrow I_{Pro}$ called mapping of instances between lexicon and process knowledge base FIG. 5 depicts a possible embodiment of a lexicon ontology that is a structure as follows:

Concepts $C_{Lex}$:
 {WordEntity, ApplicationDomain, Number, MathematicalOperator, Adverb, Adverbsynset, Conjunction, Preposition, Adjective, AdjectiveSynset, NounPhrase, NounPhraseSynset, Attributes, Noun, NounSynset, Verb, ActiveVerb, ActiveVerbSynset, PassiveVerbsynset)

Concept Hierarchy $\leq_{C_{Lex}}$:
 {(Number, WordEntity), (MathematicalOperator,WordEntity), (Adverb, WordEntity), (Conjunction, WordEntity), (Preposition, WordEntity), (Adjective, WordEntity), (NounPhrase, WordEntity), (Noun, WordEntity), (Verb, WordEntity), (ActiveVerb, Verb), (PassiveVerb, Verb)}

Relations $R_{Lex}$:
 {hasApplicationDomain, hasAdverbSynset, hasAdjectiveSynset, hasAdjective,
 hasNounPhraseSynset, hasNoun, hasAttribute, hasNounSynset, isPluralOfNoun,
 isAcronymOfNoun, isPluralOfNounPhrase, isAcronymOfNounPhrase, isActiveVerbOf,
 isPassiveWordOf, hasPassiveVerbSynset, hasActiveVerbSynset)

Signature of Relations $\sigma_{Lex}$:
 {hasApplicationDomain→(WordEntity, ApplicationDomain),
 hasAdverbSynset→(Adverb, AdverbSynset),
 hasAdjectiveSynset→(Adjective, AdjectiveSynset),
 hasAdjective→(NounPhrase, Adjective),
 hasNounPhraseSynset→(NounPhrase, NounPhraseSynset),
 hasNoun→(Nounphrase, Noun),
 hasAttribute→{(NounPhrase, Attribute), (Noun, Attribute)},
 hasNounSynset→(Noun, NounSynset)
 isPluralOfNoun→(Noun, Noun),
 isPluralOfNounPhrase→(NounPhrase, NounPhrase),
 isAcronymOfNoun→(Noun, Noun),
 isAcronymOfNounPhrase→(NounPhrase, NounPhrase),
 isActiveVerbOf→(ActiveVerb, PassiveVerb),
 isPassiveVerbOf→(PassiveVerb, ActiveVerb),
 hasPassiveVerbSynset→(PassiveVerb, PassiveVerbSynset),
 hasActiveVerbSynset→(ActiveVerb, ActiveVerbsynset)}

The top-level concept Application Domain shown in FIG. 5 is a set of application domain names the lexical entry refers to. A Word Entity classifies a lexical entry either into a Number, Mathematical Operators, Verb, Adverb, Adjective, Noun, NounPhrase, Preposition, Conjunction and has set of instances of the concept Application Domain assigned. The concepts Mathematical Operators, Conjunction and Preposition represent concepts with a finite set of initial instances.

The concept Mathematical Operators has the following set of finite instances: {for each, equal, greater than, smaller than, equal), a Conjunction comprises the instance {and}, a Preposition concept has the instances {from, of, upon, with, for}.

A Verb is either an Active Verb or a Passive Verb. The concepts Active Verb and Passive Verb are interrelated by a bidirectional relationship described by isActiveWordOf and isPassiveWordOf. A Noun is related by following relationship set: ispluralOf, isAcronymOf, hasNounPhraseSynsei). Additionally, a Noun has a set of Attributes (countable/uncountable, singular/plural). A NounPhrase consists optionally of an adjective followed by instances of nouns.

Each of the concepts Adverb, ActiveVerb, PassiveVerb, NounPhrase, Adjective have a synset assigned that captures instances of synonyms.

Figure 6:
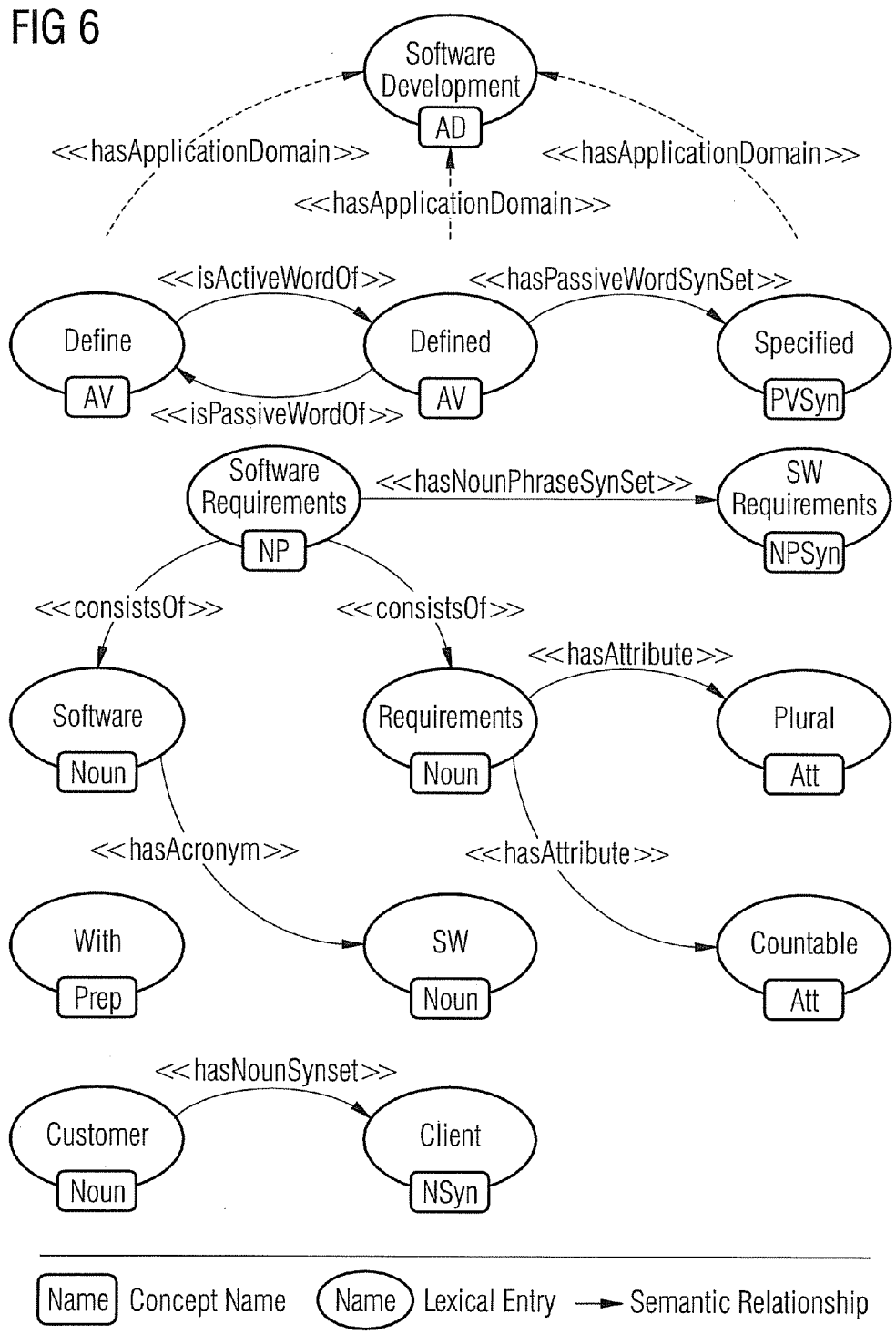
FIG. 6 shows an example for entries of a lexical knowledge base as shown in FIG. 5.

FIG. 6 illustrates an example for lexical entries that capture the vocabulary of the text clause "Define Software Requirements With Customer" used for naming an EPC-Function and "Software Requirements Defined With Customer" used for naming an EPC-Event. Please note, that these entries denote the vocabulary used for naming instances captured by the process knowledge base.

Lexical Entries $I_{Lex}$:
 {"Software Development", "Define", "Defined", "Software Requirements", "SW Requirements", "Software", "Requirements", "With", "SW", "Customer", "Client", "Specified", "Plural", "Countable")}

Instantiated Concepts $i_{C_{Lex}}$:
 (ApplicationDomain→{Software Development},
 ActiveVerb→{Define}, PassiveVerb→{Defined},
 NounPhrase→{Software Requirements},
 Noun→{Software, SW, Customer, Requirements},
 Preposition→{With}, NounSynset→{Client},
 NounPhraseSynset→{SW Requirements},
 PassiveVerbSynset→{Specified},
 Attribute→{Singular, Countable)}

Instantiated Relations $i_{R_{Lex}}$:
 (hasApplicationDomain→{(Define, Software Development), (Defined, Software DevelopmenD, . . . },
 isActiveVerbOf→{(Define, Defined},
 isPassiveVerbOf→{(Defined, Define)},
 hasPassiveVerbSynset→{(Defined, Specified)},
 hasNounPhraseSynset→{(Software Requirements, SW Requirements)},
 consistsOf→{(Software Requirements, Software), (Software Requirements, Requirements)},
 hasAttribute→{(Requirements, Plural), (Requirements, Countable)},
 has Acronym→{(Software, SW)},
 hasNounSynset→{(Customer, Client)}).

Mapping of Lexical Entries to Process Knowledge Base Entries $M_f$:
 {"Software Development"→(1), "Define"→(2), "Customer"→(3), "Software Requirements"→(4), "Software"→(5), "Identified"→(6), "Requirements"→(7)}

The lexical knowledge (morphological and syntactic knowledge) is decoupled from process knowledge. The textual counterpart for naming entries of the process knowledge base 4B is realized by the lexical knowledge base 4A.

The mapping between lexical entries and process knowledge base entries relies on some predefined rules expressed by naming conventions. Such conventions define a grammar or a pattern that specifies how EPC-Functions and Events should be named. A naming convention bridges the gap between the syntax of used terms and its semantics by mapping concepts and instances of the lexicon to concepts and instances of the process knowledge base.

A pattern is an ordered combination of pairs (n-tuple of pairs) whereas each pair consists of a word type and its semantic category (concept of the process knowledge base) it is mapped to. A pattern like ([Active Verb=Task]

[Noun=ProcessObject]) can be matched to the text clause "Define Requirements" used to name an EPC-Function to extract task and process object information.

By using naming conventions expressed by patterns, the method according to the present invention achieves fast and efficient text processing by directly mapping terms to its meaning. Based on an empirical study of about 5,000 EPO-Functions and Events in engineering domains that were named by the English language, the following common naming conventions for EPC-Functions and Events have been detected. Due to the introduced generic approach for semantic annotation, additional conventions can easily be considered, respectively integrated in the whole architecture, independent of the used language.

Basically, an EPC-Function should be named by a text phrase following the pattern ([Active Verb=Task] [Noun=Process object]). The term $t_1$ ("Define") has the semantics of a task, $t_2$ ("Project Plan") indicates a process object. Hence, a task is always mapped to an active verb.

The term for the description of a process object (PO) is expressed by a single noun or a noun phrase. A noun phrase denotes a composition of nouns that may have optionally an adjective. As a general rule refinements of process objects should be named with additional nouns or adjectives and stop words are omitted as far as possible. For example the noun "Requirements" can indicate an abstract process object. Terms meaning refinements of this process object should be named "Software Requirements" or "Hardware Requirements" and not "The Requirements For Software" or "Requirements Of Software", for example. This guideline can be expressed by the pattern ([Active Verb=Task] [NounPhrase=Process Object]). This implies automatically that an active verb associates to a task, a noun phrase to a process object.

A naming convention for the definition of parameters plays a role since they may adopt a different meaning. The different types of parameters are already discussed by the process knowledge base concepts.

"Derive Quality Goal from Specification Document" indicates "specification Document" as a Source Direction Parameter. The meaning of a Source Direction Parameter is derived from the preposition "from" that refers to a succeeding process object.

"Rework Specification for Project Plan" specifies "Project Plan" as a Target Direction Parameter, since the process object "Project Plan" is the target of task execution. It is derived from the preposition "for".

"Rework Specification with Software Goals" indicates "Software Goals" as a Means Parameter. The process object "Software Goals" has the meaning of a necessary input for the task "Rework". Such a parameter is determined by the preposition "With".

"Decide Quality Measure Upon Review Status" specifies "Review Status" as a Dependency Parameter. This means that the task "Decide" depends on the process object "Review Status". This parameter type is determined by the preposition "Upon".

Using parameters in text phrases can follow the pattern ([Active Verb=Task][Noun=Process Object] [Preposition=Parameter][Noun=Process Object]).

The semantic elements for an EPC-Event can capture state information of a process object. According to an EPC-Function, an Event may have also have one or more parameters the state refers to. Hence, the guidelines for naming process objects and parameters matches with the conventions proposed for EPC Functions.

State information can be expressed by a word being either a passive word or an adjective word followed by a process object. The text clause "Project Plan Defined" comprises the term $t_1$ ("Project Plan") and $t_2$ ("Defined") that indicates state information for the process object "Project Plan". This guideline can be expressed by the patterns ([Noun Phrase=Process Object][Passive Verb=State]) or ([Noun Phrase=Process Object][Adverb=State]).

Another rule denotes the naming of trivial events. A trivial event refers to a local state that results directly from an EPC Function and both Function and Event refers to the same process object. The EPC-Event "Project Plan Defined" indicates a trivial Event for the Function named "Define Project Plan", for example. The naming of a trivial event follows the rule that the state information indicates the passive form of the active verb used by a text phrase that describes an EPC-Function.

In many cases, textual description for an EPC-Function or Event refers to more than one task or state and/or to more than one process object and/or more than one parameter. Such combinations can be expressed by an "And" conjunction used between active and passive words and nouns or noun phrases.

As already indicated above, a lexicon is defined as a structure $O_{Lex}:=(O,M_C,M_1)$. The set $M_C$ consists of mappings between lexicon concepts and process knowledge base concepts, the set $M_1$ has mappings between lexicon entries and process knowledge base entries. Based on above discussed naming conventions, the following predefined mappings are defined:

$$M_C:=\{(C_{Lex}(A\text{Verb})\to C_{Pro}(\text{Task})),(C_{Lex}(P\text{Verb},\text{Adverb})\to C_{Pro}(\text{State})),(C_{Lex}(\text{Noun})\to C_{Pro}(\text{ProcessObject})),(C_{Lex}(\text{NounPhrase})\to C_{Pro}(\text{ProcessObject})),(C_{Lex}(\text{Adjective},\text{Noun})\to C_{Pro}(\text{ProcessObject})),(C_{Lex}(\text{Preposition})\to C_{Pro}(\text{Parameter}))\}.$$

$$M_C:=\{(I_{Lex}(\text{"For"},\text{"To"})\to I_{Pro}(\text{TargetDirectionParameter})),(I_{Lex}(\text{!From"},\text{"Of"})\to I_{Pro}(\text{SourceDorectopmÜara,eter})),(I_{Lex}(\text{"With"})\to I_{Pro}(\text{MeansParameter})),I_{Lex}(\text{"Upon"})\to I_{Pro}(\text{DepndencyParameter}))\}$$

The Semantic pattern descriptions 6 as shown in FIG. 2 enable to formalize predefined naming conventions by specifying semantic pattern templates and template structures for EPC-Functions and Events. Term structures extracted from names used to describe EPC-Functions and Events are matched against these predefined pattern descriptions in order to determine the meaning of each term. Finally, the meaning of each term is bound to semantic pattern variables in order to establish the semantic linkage between EPC-Functions and Events and process knowledge base entries.

Formally, a semantic pattern description 6 is given as a tuple SPD:=(S, TR) consisting of S that defines the semantic pattern template, TR is a set of pairs ($\{t_i, r_j\}|(T=\{t_1, \ldots t_n\}, R=\{r_1, \ldots r_n\})$ where $t_i \in T$ and $r_j \in R$), T is a set of template structures and R is a set of analysis rules.

A semantic pattern template is a tuple S:=(C,V) consisting of

C is the domain name, such as Software or Hardware.

V is a set of ordered n-tuples $\{v_1, v_i, \ldots, v_n\}$ where $i \leq n$. A variable $v_i \in V$ is a pair $(c_{Pro}, i_{Pro})$ where $c_i \in c_{Pro}$ is a variable name that points a $KB_{Pro}$ concept and $i_{Pro} \in I_{Pro}$ is a value for $c_i$ that points to an instance of the concept $c_i$ refers to.

The notation $S_E$ is used to indicate a semantic pattern template for an EPC-Event, $S_F$ for a semantic pattern template assigned to an EPC Function. The following notation for concepts of the process knowledge base can be used:{(TA=Task), (PO=Process Object), (PA=Parameter), (ST=State)}.

A semantic pattern template for an EPC-Function comprises a Task (TA) that is performed on a Process Object (PO) which may have optionally a Parameter (PA).

This semantic pattern template is defined as $S_F$ (Domain=?):={$[V_1(C_{Pro}(TA),i_{Pro}(?))],[V_2(C_{Pro}(PO),i_{Pro}(?)];$ $[V_3(C_{Pro}(PA),i_{Pro}(?))],[V_4(C_{Pro}(PO),i_{Pro}(?))]$}. It consists of an ordered set of four tuples with the variables V={$v_1, v_2, v_3, v_4$}. The question mark indicates an unbounded template. Such a semantic pattern template is instantiated by binding values to each variable and to the domain. Thus, a bound semantic pattern template realizes the semantic linkage between an EPC-Function and Event and its meaning.

Figure 7:
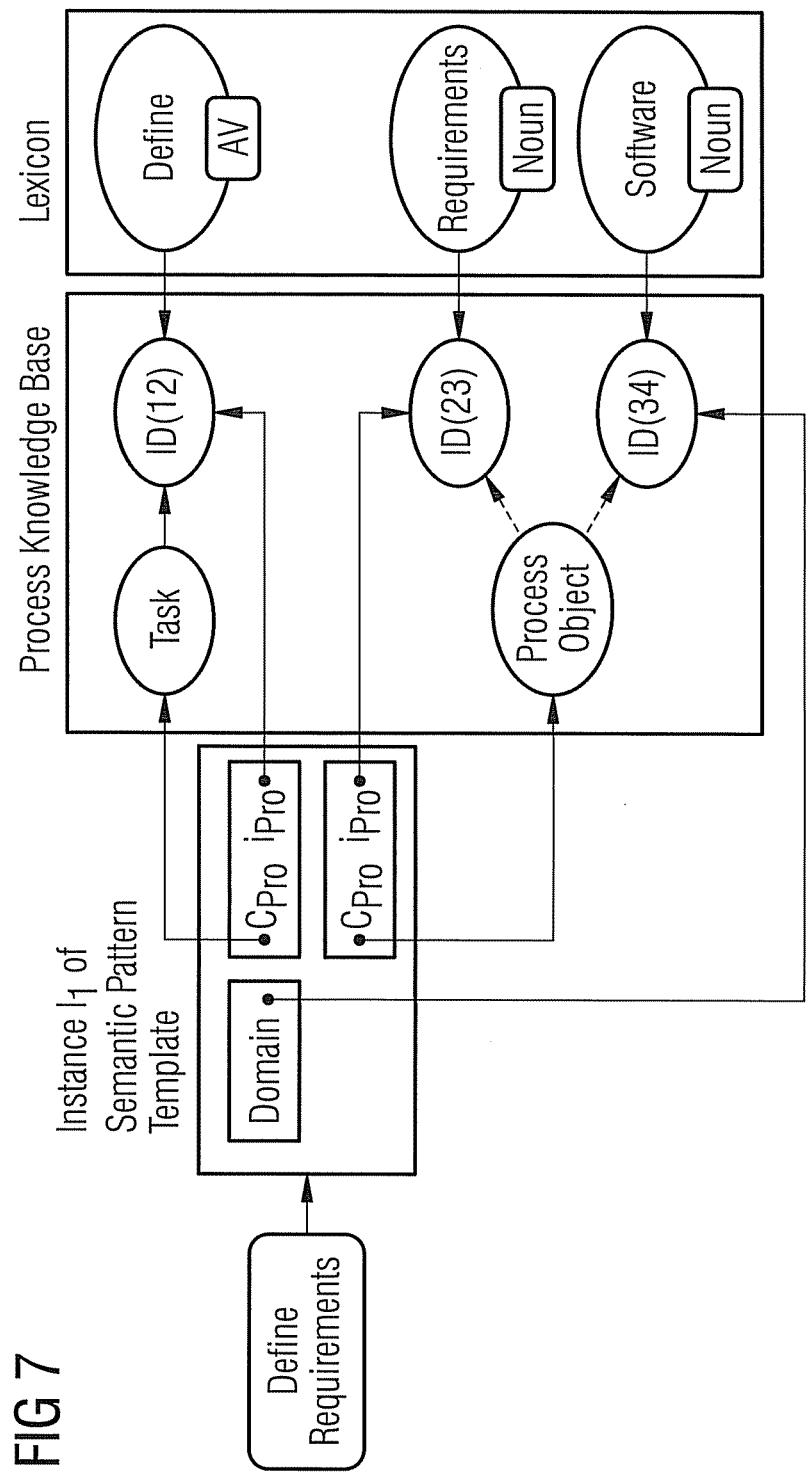
FIG. 7 shows an example of a semantically annotated EPC function.

FIG. 7 illustrates an example how the EPC-Function "Define Requirements" is semantically annotated by a bounded semantic pattern template which has the two variables $v_1$ and $v_2$. The variable $V_1(C_{Pro})$ points to the process ontology concept Task, $V_1(i_{Pro})$ has is bound to the process knowledge base entry with ID(12) that is lexically represented by the lexicon entry "Define"; the variable $V_2(C_{Pro})$ points to the process ontology concept Process Object, $V_2(i_{Pro})$ is bound to the process knowledge base entry with the ID(23) that is lexically represented by the lexicon entry "Requirements".

The semantic pattern template predefined for an EPC-Event is based on the process knowledge base concepts Process Object and State that optionally refers to a Parameter. This semantic pattern template is defined as following template having also four variables: $S_E$(Domain=?)={$[V_1(C_{Pro}(PO),i_{Pro}(?))],[V_2(C_{Pro}(ST),i_{Pro}(?)];V_3(C_{Pro}(PA),i_{Pro}(?))],$ $[V_4(C_{Pro}(PO),i_{Pro}(?))]$}

Each EPC-Function and Event is annotated with instances of these predefined semantic pattern templates. In many cases, used names for EPC-Function and Event descriptions address more than one Task, more than one Process Object or more than one Parameter or a combination of them. In such cases, an EPC-Function or Event is annotated by several instantiated semantic pattern templates.

For Example "Define Requirements and Goals" can be a name for an EPC-Function. The Task named "Define" addresses the two Process Objects "Requirements" and "Goals". Hence, the EPC-Function will be annotated with two instances of semantic pattern templates, the first template captures the meaning of "Define Requirements", the second the meaning of "Define Goals".

To cope with this in a possible embodiment, template structures in combination with analysis rules are introduced. Template structures are predefined templates assigned to semantic pattern templates. Their purpose is to map different occurring term structures extracted from used names to semantic pattern templates and to instantiate them by applying analysis rules. This means, that template structures define valid task, Process Object and Parameter combinations.

The template structure is a tuple T=(I, V) consisting of
I an unique identifier,
V as previously defined The notation $T_E$ is used to indicate a template structure for an EPC Event, $T_F$ for a template structure that is assigned to an EPC Function. Each predefined semantic pattern template can have exactly two template structures assigned.

The semantic pattern template SF as previously defined has the following template structures assigned:

$$T_{F_1}:=\{[V_1(C_{Pro}(TA),i_{Pro}(?))],[V_2(C_{Pro}(PO),i_{Pro}(?))]$$

$$T_{F_2}:=\{[V_1(C_{Pro}(TA),i_{Pro}(?))],[V_2(C_{Pro}(PO),i_{Pro}(?)]; [V_3(C_{Pro}(PA),i_{Pro}(?))],[V_4(C_{Pro}(PO),i_{Pro}(?))]\}$$

$S_E$ as previously defined for an EPC-Event comprises the following template structures:

$$T_{E_1}:=\{[V_1(C_{Pro}(PO),i_{Pro}(?))],[V_2(C_{Pro}(ST),i_{Pro}(?)]$$

$$T_{E_2}:=\{[V_1(C_{Pro}(PO),i_{Pro}(?))],[V_2(C_{Pro}(ST),i_{Pro}(?)]; [V_3(C_{Pro}(PA),i_{Pro}(?))],[V_4(C_{Pro}(PO),i_{Pro}(?))]\}$$

The variables and its index of each template structure exactly match with the associated semantic pattern template. Analysis rules generate on the basis of a template structure one or several instances of the predefined semantic pattern templates $S_E$ and $S_F$ by applying rules that specify how the template structure is logically resolved.

An analysis rule R is specified by a precondition and a body separated by a "→". The precondition consists of the operator MATCH. The operator MATCH compares predefined template structures with term structures extracted from names. A term structure denotes a normalized representation of text phrases that refers to $KB_{Lex}$ concepts. The body comprises the operator GENERATE that generates one or several instances of semantic pattern templates and assigns the instantiated semantic pattern template(s) to an EPC-Function or Event. Let U a term structure that is notated as a pattern such as [Active Verb=Task][NounPhrase=Process Object].

The following notation for an analysis rule R is given: If(MATCH(U,T($v_1, \ldots v_n$))→GENERATE({S($v_1, \ldots v_n$)}). This notation means that if a term structure matches with a predefined template structure with an ordered n-tuple of variables ($v_1, \ldots, v_n$) then generate a set of instantiated semantic pattern templates.

The following rule set defines some possible analysis rules for semantic pattern templates used for an annotation of EPC-Functions. This rule set is not an exhaustive enumeration of all possible combinations since the declarative nature of rules enables to define an arbitrary rule set.

One Task. One State, One Process Object:
U:=[Active Verb=Task][Noun=Process Object] is a term structure for a name such as "Define Requirements".
T:={$[V_1(C_{Pro}(TA),i_{Pro}(?))],[V_2(C_{Pro}(PO),i_{Pro}(?)]$ is a template structure that matches with this term structure. The R1:=If(MATCH(U, T($v_1, v_2$))→GENERATE({$S_1(v_1, v_2)$}) generates one instance of a semantic pattern template having the bounded variables $v_1$ and $v_2$.

More than One Process Object:
This rule means that if a template structure refers to more than one Process Object then the number of Process Objects determines the number of semantic pattern templates being instantiated, each having the same Task.
U:=[Active Verb=Task][Noun=Process Object][Conjunction][Noun=Process Object] is a term structure for a name such as "Define Requirements and Goals".
T:={$[V_1(C_{Pro}(TA),i_{Pro}(?))],[V_2(C_{Pro}(PO),i_{Pro}(?)];[V_3(C_{Pro}(PO),i_{Pro}(?))]$} is a template structure that matches with this term structure. The $R_2$:=If(MATCH(U, T($v_1, v_2, v_3$))→GENERATE{($S_1(v_1, v_2), S_2(v_1, c_3)$)} generates two instances of a semantic pattern template having the bounded variables $v_1, v_2$ and $v_3$.

More than One Task:
This rules means that if a template structure refers to more than one Task then the number of Tasks determines the number of semantic pattern templates being instantiated, each having the same Process Object.
U:=[Active Verb=Task][Conjunction][Active Verb=Task][Noun=Process Object] is a term structure for a name such as "Define and analyze Requirements".

$T:=\{[V_1(C_{Pro}(TA), i_{Pro}(?))], [V_2(C_{Pro}(TA), i_{Pro}(?))]; [V_3(C_{Pro}(PO), i_{Pro}(?))]\}$ is a template structure that matches with this term structure. The $R_2:=\text{If}(\text{MATCH}(U, T(v_1, v_2, v_3)) \rightarrow \text{GENERATE}(\{S_1(v_1, v_3), S_2(v_2, v_3)\})$ generates two instances of a semantic pattern template having the bounded variables $v_1$, $v_2$ and $v_3$.

More than One Parameter

This rules means that if a template structure refers to more than one Parameter then the number of Parameter determines the number of semantic pattern templates being instantiated, each having the same Task and Process Object.

U:=[Active Verb=Task][Noun=Process Object][Preposition][Noun=Process Object][Conjunction][Preposition][Noun=Process Object] is a term structure for a name such as "Define Requirements for Hardware and Software".

$T:=\{[V_1(C_{Pro}(TA), i_{Pro}(?))], [V_2(C_{Pro}(PO), i_{Pro}(?))]; [V_3(C_{Pro}(PA), i_{Pro}(?))][V_4(C_{Pro}(PO), i_{Pro}(?))][V_5(C_{Pro}(PA), i_{Pro}(?))][V_6(C_{Pro}(PO), i_{Pro}(?))]\}$ is a template structure that matches with this term structure. The $R_2:=\text{If}(\text{MATCH}(U, T(v_1, v_2, v_3, v_4, v_5, v_6)) \rightarrow \text{GENERATE}(S_1(v_1, v_2, v_3, v_4), S_2(v_1, v_2, v_5, v_6)\})$ generates two instances of a semantic pattern template having the bounded variables $v_1$, $v_2$, $v_3$, $v_4$, $v_5$, and $v_6$.

The above mentioned rules can be combined to resolve the semantics of larger template structures. For example, a template structure may have more than one task or state combined with more than one process object.

FIG. 8 shows a possible embodiment computer system 8 according to the present invention. The computer system 8 according to the present invention comprises a memory 9 for storing at least one semantically annotated structured process model output by the apparatus 1 for automatic semantic annotation as shown in FIG. 2 via the output interface 7. The semantically annotated structured process model stored temporarily in memory 9 comprises model elements named by natural language expressions and annotated with semantic linkages to the reference process ontology. The computer system 8 further comprises an apparatus 10 including a splitting unit 11, an annotation unit 12 and a decoupling unit 13.

The splitting unit 11 splits a structured process model stored in the memory 9 having at least one end event into partial process models wherein each partial process model is provided for a corresponding end event of the original process model.

The annotation unit 12 is connected to the splitting unit 11 and annotates the model elements of each partial process model provided by the splitting unit 11 with a process goal extracted from the respective model element.

The decoupling unit 13 is connected in series to the annotation unit 12 and performs a decoupling of the process goals from each annotated partial process model to generate a hierarchical process goal tree for each annotated partial process model. According to a possible embodiment a goal tree creation algorithm is executed by the decoupling unit 13. FIG. 17 shows an exemplary embodiment of such a goal tree construction algorithm. The decoupling unit 13 generates for each partial process model a corresponding to hierarchical process goal tree as shown for example in FIG. 19.

The generated hierarchical process goal trees of all annotated partial process models are stored in a memory 14 of the computer system 8 as shown in FIG. 8. The apparatus 10 shown in FIG. 8 can be formed by several calculation units for example by microprocessors in a possible embodiment the splitting unit 11, the annotation unit 12 and the decoupling unit 13 are each implemented by a separate calculation unit, such as a microprocessor. In an alternative embodiment, the splitting unit 11, the annotation unit 12 and the decoupling unit 13 can be performed by one calculation unit running a computer program which can be loaded from a data carrier.

FIG. 9 shows a flowchart of a possible embodiment of a method for automatically extraction of process goals from a semantically annotated structured process model according to the present invention.

In a first step S1 a splitting of the process model having at least one end event into partial process models is performed. For each end event of the process model a corresponding partial process model is performed by the splitting step S1 shown in FIG. 9. In a further step S2 each model elements of each partial process model is annotated with a process goal extracted from the respective model element. In a final step S3, the process goals are decoupled from the annotated partial process models to generate a hierarchical process goal tree for each annotated partial process model.

In a possible embodiment, the splitting unit 11 of the apparatus 10 shown in FIG. 8 performs the splitting step S1, the annotation unit 12 performs the annotating step S2 and the decoupling unit 13 performs the decoupling step S3. FIG. 10 shows an example for extracting of patterns from process models performed by the method and apparatus according to the present invention. According to a possible embodiment, the process model is formed by an EPC (Event Process Chain) Model. FIG. 10 shows an EPC Model comprising events E and functions F having semantic linkages to a reference ontology. Furthermore the process goal tree generated by the decoupling step S3 of the method according to the present invention comprises semantic linkages to the reference ontology. The hierarchical goal tree in FIG. 10 decompose process goals into a set of sub-goals. The reference ontology serves as a knowledge base for the semantic annotation of the EPC functions/events for an ontology based description of process goals. In the example shown in FIG. 10 the process goal A is decomposed by a sequence decomposition into sub-goals B, C and D. To each sub-goal a process pattern can be assigned, i.e. patterns B1, C1, D1, D2 that provides a process solution to meet the respective process goal. In the given example shown in FIG. 10 two process patterns D1, D2 are assigned to process goal D. The process pattern D1, D2 indicate variants for achieving that process goal D. The sequence decomposition of process goal A implies that the sub-goals B, C and D must be fulfilled in that sequence to achieve process goal A. This can be done by a goal satisfaction order as shown in FIG. 10. If sub-goal B is to be achieved, then sub-goal C and finally sub-goal D the process goal A of the respective process represented by the EPC model is met. The extraction of the process goals as performed by the method according to the present invention can be based on EPC modelling language. An EPC process model is a directed and connected graph whose nodes are formed by events, functions and logical connectors which are connected by control flow arcs. Natural language expressions describe an implicit meaning of each EPC function and event. These language expressions follow naming conventions or standards. From a naming convention a meaning of a lexical term is clear. For example a task is always expressed by an active verb, whereas a process object is formed by a word type noun. The functions F represent time and cost-consuming elements for performing a task on a process object, i.e. the task "define" can be performed on the process object "software requirement" to achieve a certain process goal. The event E of the EPC model represents states for a process object in the execution of functions and controls the further process flow. State information S for process objects PO either have a local or a global scope. A local scope refers to a state information directly produced by an EPC function, whereas a global scope refers to a partial or to a whole process model. For example if the event E "requirements identified" directly succeeds to function "indentify software requirements" then this event indicates a trivial event. An end event such as "project planned" of a process always represents a non-trivial event since it refers to the whole underlying process. Functions can be triggered by more than one event E or can produce more than one state S. In order to model such requirement, it is necessary to capture the logic of a process by using logical operators. Logical operators enable to model a complex not linear control flow of events E and functions F. Logical operators allow to model parallel alternative control flow paths. An example for logical operators are "and" and "XOR" and "or" operators.

The extraction of process goals from given EPC models and a decomposition in terms of a hierarchical tree structure are based on structured EPC models. Structured EPC models can comply with style rules and work flow constructs.

FIGS. 11a to 11g illustrate structured workflow constructs. This workflow constructs demand that for each join connector exists a corresponding split connector of the same type. Furthermore, a control flow may consist of another well structured workflow construct i.e. a so-called nested structure. FIGS. 11f to 11g specify how exit points from a control flow can be modelled.

FIG. 12 shows an example of an entry join connector as employed by the present invention. It specifies an entry point within a split joint construct realized by an entry joint connector.

The meaning of EPC functions/events can be captured implicitly by natural language clauses used for naming model elements of the EPC model. To allow an automatic processing EPC functions and events are annotated with semantic linkages to a reference ontology that captures the meaning of used vocabulary in terms of process objects, tasks and state information. This annotation empowers the computer system according to the present invention to process the meaning of the EPC function and events.

FIG. 13 depicts an example for a semantically annotated EPC model processed by the computer system 8 according to the present invention. The reference ontology captures instances of different concepts such as process objects PO, task T and states S and its semantic relationships such as "is part of". In the given example of FIG. 13 the function F "Identify Software Requirements" has a semantic linkage to the reference ontology i.e. the task "Identified" on a process object "Software Requirements". Furthermore in the given example the event "software requirements identified" comprises a semantic linkage to the same reference ontology, i.e. to the process object "Software Requirements" and to the state "Identified". The reference ontology comprises semantic relationships. The semantic linkage from EPC function/ events to reference ontology instances ensures a unique meaning of the used process vocabulary.

The annotated EPC functions/events enable to determine automatically whether an event E indicates a trivial event. An event is a trivial event if two conditions are met. First, if the process object PO of the preceding EPC function F is equal with the process object of the EPC event and secondly the state as associated with the process object PO is a state for the task associated with the function. It one of the two conditions does not hold the considered EPC event indicates a non trivial event. The event shown in the exemplary EPC model of FIG. 13 is a trivial event since it is directly derivable from the preceding function F.

The method and the system according to the present invention are provided for automatic extraction of process goals to generate hierarchical process goal trees. A process goal represents a purpose or an outcome that the process as a whole is trying to achieve. Process goals control the behaviour of a process such as a technical or a business process and indicate a desired state of some resources in the process. For example, the process goal "Identify Requirements for Software" refers to the process object "Requirements for Software" with the state "Identified". A process pattern provides a process solution for achieving the state "Identified" for the process object "Requirements for Software".

FIG. 14 illustrates an example for a process goal tree.

Process goal satisfaction depends on constraints assigned to process goals. A constraint $C \in C = (C^R \cup C^L)$ denotes a precondition that refers to a process object with certain state information. Constraints are classified into global constraints $C^R$ and local constraints $C^L$. Global constraints are assigned to the process goal that is satisfied by the whole underlying process whereas a local constraint $C^L$ refers to a decomposed subgoal. A constraint C is a quadruple (P, S, V, T) where P is a process object, S is a state associated with the process object, T={boolean, discrecte, numeric} is a type for a value assigned to V, (e.g. C1=("Development Risk", "Low", "True", "boolean")). Constraints can be composed to larger structures coupled by the prepositional expressions "and", "or", "xor".

A process goal tree results from a decomposition of process goals into subgoals through and/or/xor graph structuresas used by problem reduction techniques in artifical intelligence.

FIG. 14 illustrates an example for a process goal tree. The root goal "Sent Offer" requires that a customer request must have the state "Received=True". This is expressed by the global constraint $C_1^R$=("Request", "Received", "True", "Boolean")). In order to satisfy the goal "Performed Risk Review", the goal "Checked Development Risk" must be satisfied. Further, a satisfaction of goal C also requires that the development risk must be low that is expressed by the local constraint $C_2^L$=("Development Risk", "Low", "True", "Boolean"). The process goals C and D indicate goal variants, the satisfaction of such a variant depends on the defined constraints.

A process goal tree $G_{Tree}$ is a structure (N, V) where $N=(G \cup D)$, $(G \cap D)=\emptyset$ is a set of nodes, G is a set of goals and D is a set of decompositions {sequence, and, or, xor} over G and V is binary relation of decomposition arcs $V \subset (G \times D) \cup (D \times G)$ such that that $|t_{in} \in G|=0$ and $|t_{out} \in G|=1$, $|g_{in}"|=1$ and $|g_{out}| \leq 1$ for each $g \in G$ and $|d_{in}|=1$ and $|d_{out}| \geq 1$ for each $d \in D$.

A process goal $g \in G = (G^C \cup G^E)$ is either an elementary goal $(g \in G^E)$ or a non-elementary goal $(g \in G^C)$. Elementary goals are not further decomposed into subgoals whereas non-elementary goals are decomposed into a set of subgoals. A process goal is a structure G=(id, S, P, C) consisting of a function id:G→Integer that is a unique identifier for a process goal G, S is state for process object P and C a set of constraints associated with a goal.

A decomposition of a goal into a set of subgoals implies a satisfaction of subgoals to meet a parent goal by considering the following decompositions. A sequence decomposition decomposes a goal into an ordered tupel of subgoals wherein each must be met in a certain sequence. An and decomposition expresses an arbitrary satisfaction order of all subgoals associated with a parent goal; a xor decomposes a goal into a disjoint set of subgoal variants; an or implies a satisfaction of either one, multiple or all subgoals to comply with the parent goal.

The construction of a process goal tree such as shown in FIG. 14 with the method for automatic extraction of process goals according to the present invention comprises the steps shown in the flowchart of FIG. 9. In the first step S1 EPC models with more than one end event are split into multiple EPC models each having exactly an end event. In a further step S2 the EPC functions and events are annotated with process goals. In a final step S3 the annotated process goals are organized in terms of a goal tree as shown in FIG. 14.

FIG. 15 shows an example for illustrating the step S1 of the method according to the present invention i.e. splitting of a process model into partial process models. An end event represents the root process goal that is decomposed into a set of subgoals. If an EPC model such as shown in FIG. 15 comprises multiple end events it is split in a first step S1 of the method according to the present invention into partial EPC models each having exactly one end event from which the top level goal is extracted from. Split up of EPC models as shown in step S1 is based on exit split connectors provided in the model. Exit split connectors define a process path for an additional end event. As can be seen in FIG. 15 the structured process model comprises an exit split connector and two end events. Consequently, the structured process model is split at the exit split connector in two separate EPC models, i.e. EPC model A and EPC model B as shown in FIG. 15.

In a further step S2 partial process models such as EPC models A, B shown in FIG. 15 are separately annotated with process goals. The aim of the goal annotation is to facilitate recognizing process knowledge conveyed by heterogeneous process models based on enriched intentional semantics of processes. To achieve this the EPC functions and events are automatically annotated in step S2 with process goals and associated constraints. For annotation a distinction between trivial events and non trivial events is important. Trivial events capture elementary process goals whereas non trivial events represent process goals that a further decomposed into subgoals. Further, extracted process goals from functions F always denote elementary process goals since the extracted process goal refers to the process object modelled in a function and the state information for this process object is a local state that the task of a function refers to. For example, the function "Identify Requirements" automatically implies the trivial event "Requirements Identified". Elementary goals are extracted from semantically annotated EPC functions and non elementary process goals from the semantically annotated non trivial events.

Global constraints associated with the root goals are extracted from start events and local constraints associated with goals are extracted from events that capture the result of a decision function.

FIG. 16 shows an example illustration of the annotation of process goals to EPC functions end events. In the given example a root goal $G_{Root}$ is extracted from end event $E_{End-1}$. Further goals $G_{F-1}$, $G_{F-2}$, $G_{F-3}$ and $G_{F-4}$ are elementary goals extracted from functions $F_1$, $F_2$, $F_3$ and $F_4$. In the example the root goal constraints $C_1$ and $C_2$ are derived from start events $E_{Start-1}$ and $E_{Start-2}$ the of EPC model. Local constraints $C_3$ and $C_4$ result from event $E_1$ and $E_3$ expressing that the function F1 produces state information that results from a decision function $F_1$, e.g. "Check Development Risk". The annotation of model elements of the partial process model can be subdivided into sub-steps. In a first sub-step an instantiation of a process goal for each non trivial event and each function of the process model is performed by extracting a process object and a state from that named model element. In a further sub-step constraints extracted from events are associated with that instantiated process goals.

Global constraints instantiated with root goals are extracted from start events of the partial process models. Local constraints associated with goals are extracted from events of the partial process model which capture a result of a preceding decision function of that partial process model. In the example shown in FIG. 16 Events $E_1$ and $E_3$ are connected by an XOR connector to a decision function $F_1$. Both events have a local constraint extracted from the event.

After having annotated the model elements of each partial process model a decoupling of the process goal is performed in step S3. A process goal structure is decoupled from the goal annotated EPC structure by constructing or organizing annotated process goals in terms of a hierarchical tree. A process goal tree is generated as output by the decoupling unit 13 of the computer system 8 according to the present invention as shown in FIG. 8. In a preferred embodiment a tree construction algorithm is performed by the decoupling unit 13 starting with a semantically annotated end event of the respective partial process model.

FIG. 17 is an example of a tree construction algorithm as employed by the method according to the present invention to construct a process goal tree for a given EPC model annotated with process goals.

FIGS. 18a to 18f illustrate steps performed by the construction algorithm shown in FIG. 17. Since an EPC model may have one or several entry joins the goal tree construction invokes a goal tree construction each constructing a goal tree for a partial process chain. In the example of FIG. 16, a single goal tree is constructed for the process chain $E(S_2)$, $F_4$, $E_5$ since the control flow concludes by an "AND" entryJoin. The algorithm indicated in FIG. 17 starts with a semantic annotated end event of an EPC model and constructs a goal tree for this model.

The algorithm starts with a semantically annotated end event of an EPC model to construct a goal tree. Step 1 initializes an entryJoinQueue that captures entryItems and entry-Joins followed by an initialization of the $G_{Tree}$ (goal tree). If the model item denotes an end event, then a root goal added with a sequence node is initialized. Step 2 invokes the method SINGLE-GOALTREE-CONSTRUCTION that iterates recursively through all model items and inserts—in dependency of the model item type—goal nodes or decomposition nodes to the goal tree (Step 3). If an entry-Join is detected then the current goal node and the entry item (last node that concludes with entry Join) are added to the entryJoinQueue (Step 4). If all model items have been processed the algorithm returns the root node (t) of the constructed $G_{Tree}$ (Steps 5-9). If the entryJoinQueue is not empty then the $G_{TREE}$-CONSTRUCTION is invoked recursively (Step 10) in order to construct a $G_{Tree}$ for each partial process chain concluding with an entryJoinConnector. Step 11 initializes a new $G_{Tree}$. Since model item $E_5$ is not an end event a sequence node as child node is added. Since item $E_5$ indicates a trivial event method insertDecompositionNode ( . . . ) neglects this item. Step 12 inserts goal items associated to remaining model items. If all single $G_{Trees}$ for process chains have been constructed, they are finally merged to one $G_{Tree}$ (Step 13).

FIG. 19 shows the result of the tree construction algorithm in step S13. The constructed hierarchical process goal tree can be stored by the decoupling unit 17 via an interface in the memory 14 of the computer subsystem 8 as shown in FIG. 8. For each separated or partial EPC model a corresponding hierarchical process goal tree is generated and stored.

The method and system according to the present invention performs an automatic extraction of process goals from EPC models. The method and system according to the present invention allows to identify frequent process patterns in EPC models. The method and system according to the present invention construct a goal model in terms of the hierarchical goal tree for each EPC model being analyzed for pattern identification. In an embodiment frequent process patterns are identified by matching similar goals of each generated goal tree. Similar goals and their decomposition relations from a base for specifying semantic relationships between frequent process patterns. The specification of semantic relationships for process patterns considers also a sequence decomposition of goals for maintaining the satisfaction order of defined subgoals. The method and system according to the present invention take into account that a satisfaction order of similar goals play a vital role for specifying sequence relationships between different process patterns. The method and system according to the present invention are provided for the extraction and annotation of process goals or models which are expressed by EPC model language. Enriching process models with goal ontology facilitates to employ reasoning algorithms to identify frequent process patterns in given process descriptions. Process solutions with the same of similar process goals indicate candidates for common or best practise solutions.

The invention claimed is:

1. A method for automatic extraction of process goals from a semantically annotated structured process model of a process comprising model elements comprising functions and events named by natural language expressions and annotated with semantic linkages to a reference process ontology comprising the steps of:
   (a) splitting said process model, at each exit split connector that leads to more than one end event, into a plurality of partial process models separated for each end event of said process model, such that each partial process model of the plurality of partial process models has one or more of the model elements and only one end event;
   (b) creating for each partial process model an annotated partial process model by separately annotating the one or more of the model elements of each partial process model with extracted process goals and constraints, such that (1) each start event is annotated with an extracted root goal constraint, (2) each function is annotated with an extracted process goal, (3) each event is annotated with an extracted local goal constraint, and (4) the end event is annotated with an extracted root goal, wherein each process goal represents a purpose or an outcome of process;
   (c) decoupling of the process goals from each annotated partial process model; and
   (d) generating a hierarchical process goal tree for each annotated partial process model by organizing the decoupled process goals as goal nodes into the hierarchical process goal tree starting with the end event as a root goal node that is decomposed into a set of subgoals by inserting the goal nodes and decomposition nodes into the goal tree depending on the annotated model elements detected.

2. The method according to claim 1, wherein each process goal is formed by at least a process object and a state of said model element.

3. The method according to claim 2, wherein each decoupled process goal comprises a structure having
   an identifier for the decoupled process goal,
   a process object,
   a state of said process object, and
   a set of constraints indicating a precondition with reference to said process object and said state.

4. The method according to claim 3, wherein each constraint comprises
   the process object,
   the state associated with the process object,
   a value, and
   a type of said value.

5. The method according to claim 1, wherein said process model is formed by an EPC (event process chain) model, an UML (unified modelling language) model or a petri-network.

6. The method according to claim 1, wherein a named process element is a function provided for performing a task on a process object to transform said process object from an initial state to a resulting state or an event comprising a text clause.

7. The method according to claim 1, wherein said annotating of said model elements of each partial process model comprises:
   instantiating of a process goal for each not trivial event and each function of said process model by extracting a process object and a state from said named model element, and
   associating constraints extracted from events with said instantiated process goals.

8. The method according to claim 7, wherein global constraints associated with root goals are extracted from start events of said partial process models, and wherein local constraints associated with goals are extracted from events of said partial process model which capture a result of a preceding decision function of said partial process model.

9. The method according to claim 1, wherein the decoupling of the process goals from the annotated partial process models is performed by a goal tree construction algorithm starting with a semantically annotated end event of the respective partial process model.

10. The method according to claim 1, wherein said reference process ontology indicates a semantic meaning of the used natural expressions in terms of process objects, tasks and states.

11. The method according to claim 1, wherein the method is performed by executing a computer program stored on a data carrier.

12. A computer system for automatic extraction of process goals from a semantically annotated structured process model of a process stored in a memory, wherein said process model comprises model elements comprising functions and events named by natural language expressions and annotated with semantic linkages to a reference process ontology, said system comprising:
   (a) a splitting unit which splits said stored process model, at each exit split connector that leads to more than one end event, into a plurality of partial process models each separated for a corresponding end event of said process model, such that each partial process model of the plurality of partial process models has one or more of the model elements and only one end event;
   (b) an annotation unit which creates for each partial process model an annotated partial process model by separately annotating the one or more of the model elements of each partial process model with extracted process goals and constraints, such that (1) each start event is annotated with an extracted root goal constraint, (2) each function is annotated with an extracted process goal, (3) each event is annotated with an extracted local goal constraint, and (4) the end event is annotated with an extracted root goal, wherein each process goal represents a purpose or an outcome of process;
   (c) a decoupling unit which:
   decouples the process goals from each annotated partial process model, and
   generates a hierarchical process goal tree for each annotated partial process model by organizing the decoupled process goals as goal nodes into the hierarchical process goal tree starting with the end event as a root goal node that is decomposed into a set of subgoals by inserting the goal nodes and decomposition nodes into the goal tree depending on the annotated model elements detected.

13. The computer system according to claim 12, wherein the reference process ontology is stored in a reference ontology memory.

14. The computer system according to claim 12, wherein the generated hierarchical process goal trees are stored in a further memory for further processing.

15. A calculation apparatus for automatic extraction of process goals from a semantically annotated structured process model of a process stored in a memory, wherein said process model comprises model elements comprising functions and events named by natural language expressions and annotated with semantic linkages to a reference process ontology said apparatus comprising:

(a) means for splitting said stored process model, at each exit split connector that leads to more than one end event, into a plurality of partial process models each separated for a corresponding end event of said process model, such that each partial process model of the plurality of partial process models has one or more of the model elements and only one end event;

(b) means for creating for each partial process model an annotated partial process model by separately annotating the one or more of the model elements of each partial process model with extracted process goals and constraints, such that (1) each start event is annotated with an extracted root goal constraint, (2) each function is annotated with an extracted process goal, (3) each event is annotated with an extracted local goal constraint, and (4) the end event is annotated with an extracted root goal; and (c) means for decoupling the process goals from each annotated partial process model and generating a hierarchical process goal tree for each annotated partial process model by organizing the decoupled process goals as goal nodes into the hierarchical process goal tree starting with the end event as a root goal node that is decomposed into a set of subgoals by inserting the goal nodes and decomposition nodes into the goal tree depending on the annotated model elements detected.

* * * * *